(12) United States Patent
Madhalam et al.

(10) Patent No.: US 10,585,892 B2
(45) Date of Patent: Mar. 10, 2020

(54) HIERARCHICAL DIMENSION ANALYSIS IN MULTI-DIMENSIONAL PIVOT GRIDS

(71) Applicant: Oracle International Corporation, Redwood Shores, CA (US)

(72) Inventors: Kalpana Madhalam, Parramatta (AU); Rahul Mahashabde, Bangalore (IN); Balaji Pattabhiraman, Bangalore (IN); Deepankar Narayanan, Trivandrum (IN); Virad Gupta, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 174 days.

(21) Appl. No.: 14/710,448

(22) Filed: May 12, 2015

(65) Prior Publication Data
US 2016/0335303 A1 Nov. 17, 2016

Related U.S. Application Data

(60) Provisional application No. 62/023,132, filed on Jul. 10, 2014.

(51) Int. Cl.
*G06F 8/34* (2018.01)
*G06F 16/2455* (2019.01)
*G06F 16/28* (2019.01)

(52) U.S. Cl.
CPC ........ *G06F 16/2455* (2019.01); *G06F 16/283* (2019.01)

(58) Field of Classification Search
CPC .. G06Q 30/02; G06Q 10/0631; G06F 9/5072; G06F 17/30536; G06F 17/30554;
(Continued)

(56) References Cited

U.S. PATENT DOCUMENTS 5,911,138 A 6/1999 Li et al.
6,317,750 B1 11/2001 Tortolani
(Continued)

OTHER PUBLICATIONS

Assigning Hierarchies and Measures; http://help.infragistics.com/Help/Doc/LightSwitch/2012.2/CLR4.0/html/Pivot_Grid_Assigning_Hierarchies_and_Measures.html; Copyright 2012, downloaded circa Aug. 21, 2014; 5 pgs.
(Continued)

*Primary Examiner* — Alex Gofman
*Assistant Examiner* — Linh Black
(74) *Attorney, Agent, or Firm* — Tarolli, Sundheim, Covell & Tummino LLP

(57) ABSTRACT

A system and method facilitating transforming or updating displayed data using data hierarchy information. An example method includes storing hierarchy information characterizing a dataset via one or more tree tables; selectively accessing a database to update data characterized by metadata of the one or more tree tables; employing one or more pivot grids to replicate one or more hierarchical properties of the one or more tree tables; and displaying information based on the one or more pivot grids. The displaying step may further include using the pivot grid(s) to generate and display analytic(s), wherein data for the pivot grid(s) and analytics(s) is obtained from flattened tree tables. Dynamically executed Structured Query Language (SQL) construct(s) may retrieve un-cached fresh multi-dimensional data used for the pivot grid(s) or analytic(s) in a manner consistent with hierarchy information retrieved (via SQL) from the tree tables as tree metadata.

21 Claims, 12 Drawing Sheets

(58) Field of Classification Search
CPC .... G06F 17/30598; G06F 3/0482; G06F 8/34; G06F 8/38; G06F 8/427; G06T 11/206; Y10S 707/956; Y10S 707/99943; G09G 5/14; H04L 41/22
USPC ....... 707/600, 610, 615, 634, 778, 829, 714, 707/763

See application file for complete search history.

(56) References Cited

U.S. PATENT DOCUMENTS

| | | | |
|---|---|---|---|
| 6,581,054 B1 | 6/2003 | Bogrett | |
| 6,707,454 B1 | 3/2004 | Barg | |
| 7,181,450 B2 | 2/2007 | Malloy | |
| 7,315,849 B2* | 1/2008 | Bakalash | G06F 17/30457 |
| 7,333,982 B2* | 2/2008 | Bakalash | G06F 17/30457 707/600 |
| 7,334,223 B2* | 2/2008 | Kumar | G06F 8/36 717/104 |
| 7,590,652 B2* | 9/2009 | Passey | G06F 17/30091 |
| 7,698,348 B2 | 4/2010 | Walker et al. | |
| 7,870,016 B2* | 1/2011 | Fazal | G06Q 10/10 705/7.36 |
| 7,912,845 B2* | 3/2011 | Barstow | G06F 17/30557 707/741 |
| 7,941,394 B2 | 5/2011 | Error | |
| 7,970,728 B2* | 6/2011 | Honzal | G06F 17/30592 707/600 |
| 8,024,365 B2* | 9/2011 | Wilding | G06Q 10/06 707/797 |
| 8,180,713 B1 | 5/2012 | Rigby et al. | |
| 8,359,299 B2* | 1/2013 | Angus | G06F 17/30563 707/705 |
| 8,478,796 B2* | 7/2013 | Post | G06F 12/0246 707/813 |
| 8,589,867 B2* | 11/2013 | Zhang | G06F 8/45 717/106 |
| 8,640,037 B2 | 1/2014 | Goodwin et al. | |
| 8,661,023 B1* | 2/2014 | Chun | G06F 17/30961 707/718 |
| 8,751,544 B2 | 6/2014 | Mui et al. | |
| 9,704,162 B2* | 7/2017 | Bhatia | G06Q 30/00 |
| 9,742,724 B2 | 8/2017 | Bailey | |
| 9,813,064 B2* | 11/2017 | Low | H03K 19/017581 |
| 2002/0184187 A1 | 12/2002 | Bakalash | |
| 2003/0033192 A1 | 2/2003 | Zyman et al. | |
| 2004/0015783 A1* | 1/2004 | Lennon | G06F 17/30389 715/235 |
| 2004/0122884 A1 | 6/2004 | Lee | |
| 2005/0160399 A1* | 7/2005 | Kumar | G06F 8/36 717/104 |
| 2005/0179684 A1* | 8/2005 | Wallace | G06T 11/206 345/419 |
| 2006/0173812 A1 | 8/2006 | Bahl et al. | |
| 2007/0244650 A1 | 10/2007 | Gauthier | |
| 2008/0046808 A1 | 2/2008 | Malkin | |
| 2008/0288889 A1 | 11/2008 | Hunt et al. | |
| 2009/0018996 A1* | 1/2009 | Hunt | G06Q 30/02 |
| 2009/0187815 A1 | 7/2009 | Becerra, Sr. et al. | |
| 2009/0216808 A1* | 8/2009 | Wallace | G06T 11/206 |
| 2009/0271238 A1 | 10/2009 | Himley et al. | |
| 2009/0319544 A1 | 12/2009 | Griffin et al. | |
| 2010/0156889 A1* | 6/2010 | Martinez | G06F 17/30554 345/418 |
| 2012/0078845 A1* | 3/2012 | Kasbekar | G06Q 10/107 707/640 |
| 2012/0123924 A1 | 5/2012 | Rose et al. | |
| 2012/0185425 A1 | 7/2012 | Reeves et al. | |
| 2012/0214142 A1* | 8/2012 | Togawa | G06Q 10/06 434/219 |
| 2013/0055128 A1 | 2/2013 | Muti et al. | |
| 2013/0145244 A1 | 6/2013 | Rothschiller et al. | |
| 2013/0185624 A1 | 7/2013 | Appleyard et al. | |
| 2013/0197953 A1 | 8/2013 | Sholes et al. | |
| 2014/0019415 A1 | 1/2014 | Barker et al. | |
| 2014/0249999 A1 | 9/2014 | Johnson et al. | |
| 2014/0280284 A1 | 9/2014 | Emanuel et al. | |
| 2014/0282910 A1 | 9/2014 | Palmer et al. | |
| 2015/0220607 A1 | 8/2015 | Chakra et al. | |
| 2015/0381931 A1 | 12/2015 | Uhma et al. | |
| 2017/0235786 A9 | 8/2017 | Faith et al. | |

OTHER PUBLICATIONS

Defining Metadata (igOlapFlatDataSource); http://help.infragistics.com/Help/Doc/jQuery/2013.1/CLR4.0/html/igOlapFlatDataSource_Defining_Metadata.html; Copyright 1996-2013; downloaded circa Aug. 21, 2014; 9 pgs.

Microstrategy9 Basic Reporting; http://www2.microstrategy.com/producthelp/9.4/manuals/en/BasicReporting.pdf; Copyright 2013; downloaded circa Aug. 21, 2014; 490 pgs.

Business Intelligence: Multidimensional Data Anlysis; http://www8.cs.umu.se/education/examina/Rapporter/PerWesterlund.pdf; Aug. 20, 2008; 58 pgs.

OLAP Pivot Grid for WPF; https://www.syncfusion.com/products/wpf/bi-pivotgrid; Copyright 2001-2015; downloaded circa Aug. 21, 2014; 24 pgs.

VCL Pivot Grid; https://www.devexpress.com/Products/vcl/ExPivotGrid/; downloaded circa Aug. 21, 2014; 3 pgs.

KINAMU Reporter; http://dl.sugarforge.org/kinamureporter/02KReporter/V2.5/Release_Notes_v2.5.pdf; Apr. 2010; 30 pgs.

E21 Analytics; http://www.tgiltd.com/whitepapers/e21analytics/E21Analytics%20Users%20Guide.pdf; downloaded circa Aug. 21, 2014; 62 pgs.

Understanding RadPivotGrid; http://www.telerik.com/help/wpf/radpivotgrid-started-understanding-pivot.html; Copyright 2002-2015; downloaded circa Aug. 21, 2014; 1 pg.

Lite Point IQ frame; http://docs.evergreen-ils.org/2.1/html/generate-report.html.

Creating a chart; https://docs.campaign.adobe.com/doc/AC6.1/en/RPT_Creating_new_reports_Creating_a_chart.html.

U.S. Office Action corresponding to U.S. Appl. No. 14/710,441, dated Apr. 5, 2018, pp. 1-28.

The "Pivot Charting" Document, WebGrid.net Enterprise 6.0, Copyright 2007, Intersoft Solution Corp, 52 pages.

IBM Corporation—"Content Analytics with Enterprise Search"; obtained at http://public.dhe.ibm.com/common/ssi/ecm/en/zzd03138usen/ZZD03138USEN.pdf; version 3.0; Jun. 2012; 8 pgs.

Meyer, David; SAP Marries Transaction Processing with Analytics by Putting Business suite on Hana; obtained at http://gigaom.com/2013/011 11/sap-marries-transaction-processing-with-analytics-by-putti ng-business-suite-on-hana/; Jan. 11, 2013; 4 pgs.

Stolte, Chris, et al.; "Polaris: A System for Query, Analysis, & Visualization of Multidimensional Relational Databases"; http://graphics.stanford.edu/papers/polaris_extended/polaris.pdf; Jan.-Mar. 2002; 14 pgs.

Qlik View Business Intelligence; obtained at http://www.visualintelligence.co.nz/QlikView.php; downloaded Aug. 20, 2014; 3 pgs.

Qlik View Business Discovery Platform; obtained at http://www.qlik.com/en/explore/products/qlikview; downloaded Aug. 20, 2014; 4 pgs.

MicroStrategy Web; obtained at http://www.microstrategy.com/us/software/products/web; Copyright 2010; downloaded Aug. 20, 2014; 12 pgs.

U.S. Office Action corresponding to U.S. Appl. No. 14/710,448 dated Apr. 2, 2019.

U.S. Office Action corresponding to U.S. Appl. No. 14/710,441 dated Jun. 28, 2019.

Final Office Action for U.S. Appl. No. 15/217,836 dated Jun. 26, 2019.

Non Final Office Action for U.S. Appl. No. 14/710,441 dated Jun. 28, 2019.

\* cited by examiner

Browser XYZ
...URL for Enterprise App... ← 62

◀ Back    Pivot Grid Wizard

Specify Data Model Values
Specify Column Type and Aggregate Functions

① ② ③ ④ ⑤ ← 74

Title: *General Ledger* ← 76

78 → Select Data Source Information

| General Options | Tree Options | Formatting Options |

← 84

| Data Source Columns | Attach Tree | Detach Tree | Tree Name | Tree Node |
|---|---|---|---|---|
| Unit | Attach Tree | DetachTree | | |
| Ledger | Attach Tree | DetachTree | | |
| Account 86 | Attach Tree | DetachTree | ACCTROLLUP_PVG — 102 | ALLACCOUNTS 🔍 ← 104 |
| All Acct. | Attach Tree | DetachTree | | |
| ... | | | | |

80 →  (Data Source Columns)
82 →  (Account)

FIG. 3

Pivot Grid — 160

|  | Year (Sum) | Period (Sum) | Total Amt (Sum) |
|---|---|---|---|
| All Accounts — 162 | | | |
|   Balance Sheet Ac... | | | |
|     Asset Accounts | — 164 | | |
|       Current Assets | | | — 166 |
|         ⊖ Cash and Cash Eq... | 20041 | 45 | -6764382.000 |
|           100000 | 2003 | 6 | -1000.000 |
|           100001 | 4013 | 7 | -304800.000 |
|           100002 | 3998 | 2 | -6593525.000 |
|           100003 | 10027 | 30 | 134943.000 |
|         ⊕ Marketable Secur... | 6008 | 36 | 7679700.000 |
|         ⊕ Accounts Receiva... | 92283 | 256 | 2150582.670 |
|         ⊕ Prepaid Expenses | 6008 | 36 | 1232289.330 |
|         ⊕ Inventory Accounts | 8017 | 45 | 3299808.660 |
|         ⊖ Other Current As... | 36028 | 70 | 1470215.868 |
|           100103 | 2005 | 2 | 23.000 |
|           100105 | 1999 | 1 | 360800.000 |
|           100106 | 1999 | 1 | 240600.000 |
|           100107 — 170 | 1999 | 1 | 228050.000 |
|           100108 | 3998 | 7 | 201750.000 |
|           100113 | 2005 | 2 | -220.000 |
|           100208 | 2005 | 5 | 100000.000 |
|           120500 | 1999 | 1 | 153525.000 |

168 (annotation pointing to rows under Cash and Cash Eq...)

FIG. 5B

▼ Pivot Grid  ← 190

|  | Year (Sum) | Period (Sum) | Total Amt (Sum) |
|---|---|---|---|
| All Accounts ← 192 | | | |
|   Balance Sheet Ac... | | ← 194 | |
|     Asset Accounts | | | |
|       Current Assets | | | |
|         ⊟ Cash and Cash Eq... | 36051 | 64 | -5633379.000 |
|           100000 | 2003 | 6 | -1000.000 |
|           100001 | 4013 | 7 | -304800.000 |
|           100002 | 3998 | 2 | -6593525.000 |
|           100003 | 10027 | 30 | 134943.000 |
|           100103 | 2005 | 2 | 23.000 |
|           100105 | 1999 | 1 | 360800.000 |
|           100106 | 1999 | 1 | 240600.000 |
|           100107 ← 170 | 1999 | 1 | 228050.000 |
|           100108 | 3998 | 7 | 201750.000 |
|           100113 | 2005 | 2 | -220.000 |
|           100208 | 2005 | 5 | 100000.000 |
|         ⊞ Marketable Secur... | 6008 | 36 | 7679700.000 |
|         ⊞ Accounts Receiva... | 92283 | 256 | 2150582.670 |
|         ⊞ Prepaid Expenses | 6008 | 36 | 1232289.330 |
|         ⊞ Inventory Accounts | 8017 | 45 | 3299808.660 |
|         ⊟ Other Current As... | 20018 | 51 | 339212.868 |
|           120500 | 1999 | 1 | 153525.000 |
|           ⋮ | | | |

FIG. 5D

HIERARCHICAL DIMENSION ANALYSIS IN MULTI-DIMENSIONAL PIVOT GRIDS

CROSS REFERENCES TO RELATED APPLICATIONS

This application claims priority from U.S. Provisional Patent Application Ser. No. 62/023,132, entitled SUPPORT HIERARCHICAL DIMENSION ANALYSIS IN MULTI-DIMENSIONAL PIVOT GRIDS, filed on 10 Jul. 2014, which is hereby incorporated by reference as if set forth in full in this application for all purposes.

This application is related to the following application, U.S. patent application Ser. No. 14/710441, entitled EMBEDDING ANALYTICS WITHIN TRANSACTION SEARCH, filed on 12 May 2015, which is hereby incorporated by reference, as if set forth in full in this specification:

BACKGROUND

The present application relates to computing and more specifically to software, User Interfaces (UIs), methods, and accompanying systems for retrieving, arranging, and/or displaying data from a database.

Methods for arranging or displaying data from databases are employed in various demanding applications, including enterprise applications, such as Business Intelligence (BI), Performance Management (PM), Human Capital Management (HCM) applications. Such applications often demand efficient versatile mechanisms for searching data and displaying up-to-date data from different perspectives, and for enabling manipulation and organization of data without undue computational complexity and accompanying overhead processing.

Use of recent data used to illustrate search results and to perform data analysis (e.g., via illustrative graphics or analytics) can be particularly important in enterprise applications, where critical business decisions may depend upon accuracy of the data being analyzed.

Conventionally, enterprise applications (e.g., BI applications) cache or warehouse data retrieved from a database before analyzing the cached data. The cached data is then used for data analysis operations, e.g., displaying analytics. The cached data may represent OnLine Analytical Processing (OLAP) cubes, which may include dimensions and hierarchies established at software design time. During analysis, cube data may be sliced and diced via a calculation engine, or a database can be used to cache the data in physical storage, e.g., a hard drive.

However, if underlying data changes before the cache is refreshed, the cached data may be stale, i.e., expired and not reflective of current transaction data. Frequent refreshing of cached data may be prohibitively slow, requiring excessive computing resources.

SUMMARY

An example method for facilitating transforming or updating displayed data of a pivot grid without caching, e.g., by using metadata specifying tree hierarchy information includes: storing hierarchy information characterizing a dataset via one or more tree tables; selectively accessing a database to update data, e.g., tree structure leaf data, characterized by metadata of the one or more tree tables; employing one or more pivot grids to replicate one or more hierarchical properties of the one or more tree tables; and displaying information based on the one or more pivot grids.

In a more specific example embodiment, the displaying step further includes using the one or more pivot grids to generate and display an analytic. One or more Structured Query Language (SQL) constructs are employed to facilitate representing, i.e., retrieving for display, multi-dimensional data to be included in the one or more pivot grids. One or more SQL queries may be dynamically executed against the database, whereby when data in the database changes, corresponding data in the one or more tree tables is automatically updated.

The one or more SQL constructs may include an SQL rollup construct, which may act to aggregate data of the dataset from the database. An SQL grouping construct (and associated inner join) may facilitate grouping and/or joining retrieved data from a database, wherein the retrieved data may characterize a flattened tree table, in accordance with a dimension and search criteria.

In an illustrative embodiment, the example method further includes: representing a set of data via a first hierarchical tree structure; employing the first hierarchical tree structure to generate a first set of one or more tables of data characterizing data of the set of data; receiving user input indicating one or more operations to be performed on the first set of one or more tables; performing the one or more operations on the first set of one or more tables (e.g., by manipulating an associated analytic or pivot table) resulting in an updated second set of one or more tables in response thereto; and using the updated second set of one or more tables to generate a second hierarchical tree structure reflecting a change in data responsive to the updating of the first set of one or more tables.

The example method may further include using metadata to store hierarchical information characterizing the first hierarchical tree structure, and wherein the first and second sets of one or more tables include one or more flattened tree tables storing leaf data for associated tree structures. One or more pivot grids may facilitate performing the one or more operations, which may include a join operation, whereby the join operation results in joining two or more tables or dimensions of the first set of one or more tables of data in accordance with search and/or filtering criteria.

Data of the updated set of one or more tables may be mapped to a pivot grid that reflects or is based on a hierarchical arrangement of data of the updated set of one or more tables. Another user option may facilitate augmentation of or adjustment of a hierarchy characterizing the pivot grid by enabling: attaching a hierarchical tree structure to a dimension of the pivot grid; and mapping the attached hierarchical tree structure to the dimension of the pivot grid.

Hence, certain embodiments discussed herein may overcome various limitations of existing data search, analysis, and modification software, in part by storing hierarchy information characterizing a set of data in tree tables. Data in the tables may be quickly updated without requiring retrieval and caching of the entire dataset (used for presentation of UI display screens and accompanying analytics) from a database.

The hierarchy information, stored in tree tables, can be updated as needed, e.g., during data access. Pivot grids pick up the latest tree structures from the tables and it utilizes the power of databases and SQL constructs, such as rollup and grouping or join constructs, to represent multi-dimensional data only using SQL queries and in-memory data manipulation (e.g., manipulation of data maintained in RAM) at runtime. No data caching is required. In addition, since queries are dynamically executed against the database, retrieved data is fresh.

Accordingly, certain embodiments discussed herein enable hierarchical information to be used in dimensions of a pivot grid without requiring data caching or special warehousing separate from the underlying database. The resultant data is relatively current and accurate. Database SQL constructs, such as rollup, facilitate aggregation and subsequent manipulation of enterprise transaction data.

A further understanding of the nature and the advantages of particular embodiments disclosed herein may be realized by reference of the remaining portions of the specification and the attached drawings.

BRIEF DESCRIPTION OF THE DRAWINGS

FIG. 3 illustrates a second example UI display screen with user options for enabling association of a tree and a tree node with a dimension of a data source, e.g., component, dimension, or other set of data.

FIG. 5B illustrates a fifth example UI display screen showing a pivot grid corresponding to the tree of FIG. 5A before adjustments are made to the tree.

FIG. 5D illustrates a seventh example UI display screen showing an adjusted pivot grid corresponding to the adjusted tree of FIG. 5C.

DETAILED DESCRIPTION OF EMBODIMENTS

Figure 1:
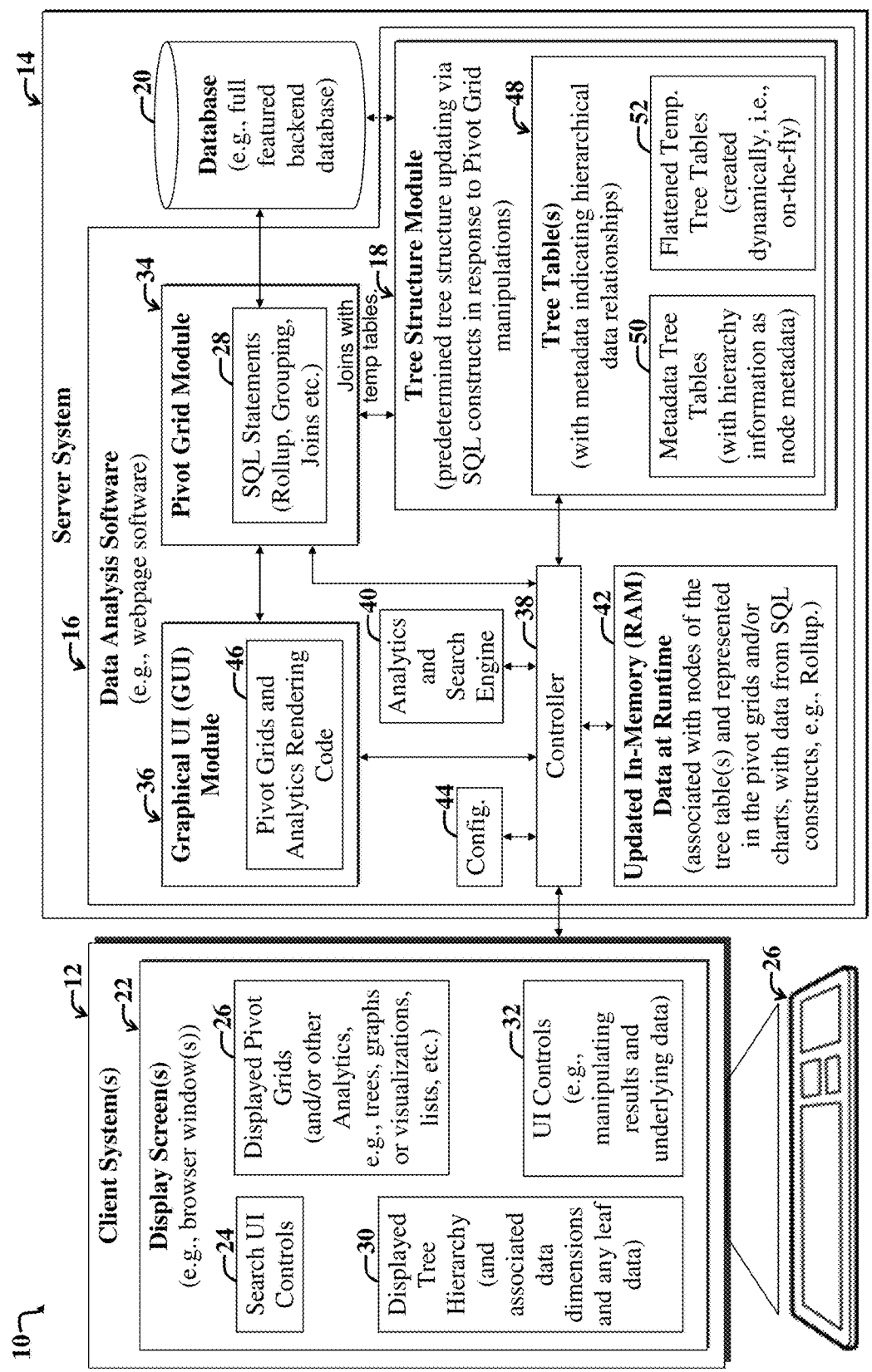
FIG. 1 illustrates a first example system and accompanying enterprise computing environment facilitating integration of transaction search results, pivot tables, and other analytics via use of an underlying tree hierarchy configured for use with a preselected data component to analyze, modify, and/or otherwise transform or perform actions on associated data.

For the purposes of the present discussion, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, i.e., software. Generally, software functionality may be accessible via use of a user interface, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. Examples of enterprise software include Enterprise Resource Planning (ERP) software for facilitating managing enterprise activities (e.g., product planning, inventory management, marketing, sales, and so on). Example ERP applications include Customer Relationship Management (CRM), Human Capital Management (HCM), Business Intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as User Interface (UI) software modules or components.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For the purposes of the present discussion, multi-dimensional data may be any data that can be partitioned by interrelated groupings or categories. A data dimension, often simply called "dimension," may be any category, such as an amount category, used to group or categorize data.

A data level may be any categorization of data of a given dimension. For example, data that includes a location dimension may include different data levels associated with state, county, city, and so on. Such data levels may represent an extrinsic sub-hierarchy of an intrinsic hierarchy that includes the location dimension. In general, extrinsic hierarchies include various data levels, while intrinsic hierarchies may include several dimensions that may include different data levels.

Financial data is often characterized by a hierarchy. For the purposes of the present discussion, a hierarchy may be any arrangement of items, e.g., data objects, names, values, categories, and so on. The items may be ordered or positioned such that they exhibit superior or subordinate relationships with related items in a data set. A hierarchy may refer to a displayed representation of data items or may refer to data and accompanying relationships existing irrespective of the representation.

Data hierarchies may be categorized as explicit and/or implicit hierarchies. Explicit hierarchical representations of data are organized according to hierarchical relationships inherent within the data. Such hierarchical relationships are often based on persistent data attributes characterizing the data. An example of an extrinsic hierarchy includes information about cities arranged by country, state, county, and so on. Another example may be a human resources hierarchy, which depicts a corporate structure, where employees are subordinate to project managers, which are subordinate to regional directors, and so on. In general, explicit hierarchies are defined and maintained irrespective of the visualization technique used to display the data.

For the purposes of the present discussion, an implicit hierarchical representation, i.e., implicit hierarchy, may refer to an organization of data and relationships that is user instantiated by choices made to display and/or analyze the data. Hence, certain implicit hierarchies may be implied from the way that users classify and summarize detailed amounts or metrics by different data dimensions on reports and analytics. Each level of an implicit hierarchy may correspond to a data dimension displayed in a report or analytic. A data dimension may be any category or classification of an amount or category. For example, columns of a table may represent data dimensions.

In certain embodiments discussed herein, trees (also called tree structures herein) that define a hierarchical structure characterizing data can be created by a human user such as an administrator. Different utilities may be provided, such as TreeManager® in the PeopleSoft® suite of software products, which can allow a user to define trees or other hierarchies. Once defined, the tree can be applied to data to allow viewing of the data in accordance with the tree hierarchy. For example, spending accounts for each department in a large company can be organized according to the tree structure of the departments within the organization.

For clarity, certain well-known components, such as hard drives, processors, operating systems, power supplies, routers, Internet Service Providers (ISPs), identity management systems, workflow orchestrators, Tenant Automation Systems (TASs), certain web services, web services, and so on, are not necessarily explicitly called out in the figures. However, those skilled in the art with access to the present teachings will know which components to implement and how to implement them to meet the needs of a given implementation.

FIG. 1 illustrates a first example system 10 and accompanying enterprise computing environment facilitating integration of transaction search results, pivot tables, and other analytics, as presented via a User Interface (UI) display screen 22, via use of an underlying tree hierarchy configured for use with a preselected data component to analyze, modify, and/or otherwise transform or perform actions on associated data.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display A tree hierarchy may be a hierarchy characterized by a group of related nodes, such as attributes, dimensions, labels, data objects, etc., which may be arranged in levels, where higher levels are characterized by nodes that exhibit superior relationships relative to nodes of lower levels. Higher level nodes are called parents, grandparents, etc., of related lower level nodes, e.g., child nodes, grandchild nodes, and so on.

A tree hierarchy, also called tree structure herein, may exhibit nodes corresponding to data dimensions and/or leaf data. Leaf data may represent data of the lowest level node (called a leaf node) along any branch of the tree structure, such that the leaf node lacks any child nodes.

In certain embodiments discussed herein, tree structures may be employed to represent data dimensions and/or groups of data dimensions, which may facilitate navigating the data dimensions. For example, a given travel authorization dimension may include a travel detail dimension, a destination dimension, report date, expense amount, and so on.

The dimensions may include subcategories or attributes. For example, the destination dimension may include names of cities, e.g., Bangalore, Dallas, etc. The report date dimension may include attributes, e.g., specific dates corresponding to a particular report date. Similarly, the expense amount dimension may include leaf data identifying a particular cost or expense associated with a particular travel detail dimension, of which the expense amount is a sub-dimension or node.

Note that, in general, groupings of various modules of the system 10 are illustrative and may vary, e.g., certain modules may be combined with other modules or implemented inside of other modules, or the modules may otherwise be distributed differently among a network or within one or more computing devices, without departing from the scope of the present teachings.

The example system 10 includes one or more client systems 12, e.g., desktop computer, mobile device, and so on, in communication with a server system 14, e.g., a grouping of one or more servers. The server system 14 runs data analysis software 16, which may be accessible via the client system 12 by employing the client system 12 to browse to a website hosting the data analysis software 16.

Various modules of the data analysis software 16 may be loaded into and executed via runtime memory 42, which may be part of a runtime system. The data analysis software 16 communicates with a backend database 20. Those skilled in the art will appreciate that web services, Application Programming Interfaces (APIs), bindings, and so on, may be employed to facilitate communications between the data analysis software and the backend database 20.

The client system 12 may run a browser, Graphical User Interface Software, and other standard modules that may be employed to communicate with the server system 14. The client system 12 further includes user input devices 26, which facilitate user interaction with the server-side data analysis software 16 via a UI display screen 22. The UI display screen 22 may represent a browser window.

The overall system 10 is adapted to search for business objects and associated transactions, and manipulate the search results and the business objects using pivot grids, analytics, software action menus, and so on. Data to be searched is characterized by a hierarchy in the database 20, where the hierarchy may be predefined (as characterizing a data component to be searched), e.g., during configuration of the data analysis software 16. The data analysis software 16 is adapted to facilitate retrieving search result data from the backend database 20, without the need for caching, by using Structured Query Language (SQL) programming language constructs, e.g., statements, with reference to tree hierarchy information (e.g., tree hierarchy metadata, as maintained via metadata tree tables 50) characterizing the data component, as discussed more fully below.

For the purposes of the present discussion, metadata may be any data or information describing data or otherwise describing data and/or functionality, e.g., describing relationships between nodes of a tree hierarchy.

The example UI display screen 22 includes search UI controls 24, e.g., for specifying search parameters or criteria characterizing a query. A given search may include one or more queries based on a specified parameter; one or more filtering operations; one or more pivot grid or analytics manipulations, and so on.

For the purposes of the present discussion, a pivot grid may be any grid or table that is adapted to enable user repositioning or rearrangement of row headers and/or column headers (corresponding to data dimensions) and accompanying data. For example, in certain applications, a row header may be dragged to an upper edge of the pivot table, resulting in automatic rearrangement of headers and fields (showing multi-dimensional data) represented by the table. Furthermore, a column header of an upper table edge may be dragged to a side edge of the pivot table (in a process called pivoting) to cause automatic rearrangement and repositioning and/or sorting of data presented via the pivot grid. Accordingly, a cross-tabular report may represent a type of pivot grid. In general, the terms "pivot grid," "pivot table," and "cross-tabular report" may be employed interchangeably herein. A pivot grid, or table, can include summarization tools found in data visualization programs such as spreadsheets or business intelligence software. Some embodiments of pivot tables may automatically sort, count, total or give the average of the data stored in one table or spreadsheet, displaying the results in a second table showing the summarized data.

Similar to spreadsheets, certain pivot tables may provide options for automatically generating subtotals and totals for grid data. Certain pivot tables may incorporate functionality for enabling users to change the layout of attributes using drag-and-drop operations, such as by pivoting or reposition data labels and the associated data layer from one location on the row or column edge to another to obtain different views of your data, supporting interactive analysis.

The example UI display screen 22 further includes a displayed tree hierarchy 30 or portion thereof. The displayed tree portion 30 may represent one or more dimensions, which may be dragged onto a pivot grid or analytics section 26, resulting in an adjustment to the pivot grid 26, depending upon how the dragged dimension is positioned on the existing pivot grid 26, as discussed more fully below.

Additional UI controls 32 provide user options for manipulating search results and associated underlying data, such as by enabling a user to modify business objects associated with displayed data dimensions in a pivot grid or analytic 26. The UI controls 32 may provide additional user options for triggering various software actions related to the displayed pivot grid and/or analytic 26, such as drilling down into data underlying a particular dimension or chart feature; sending an email to enterprise personnel associated with a particular data dimension, and so on.

For the purposes of the present discussion, a software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an ERP software application, displaying a dialog box, and so on.

An analytic may be any data visualization or any visualization based on one or more calculations based on underlying data. A visualization may be any graphical or pictorial representation of data in accordance with a method or scheme. Example visualizations include pie charts, treemaps, bar charts, line graphs, N-boxes, maps with data layers, and so on The UI display screen 22 and sections thereof may change depending upon user login credentials and operational mode of the data analysis software 16. For example, during a configuration mode, the displayed tree hierarchy 30 may represent a hierarchy characterizing a data component of the database 20 to be configured for searching by the data analysis software 16 during an operation mode. During configuration, a manager may, for example, drag one or more sections of the tree 30 to the pivot grid section 26 to attach dimensions to the pivot grid 26. Additional options are discussed more fully below with reference to FIG. 2.

The example data analysis software 16 includes a GUI module 36, which includes pivot grid and analytics rendering code 46 for generating rendering instructions for rendering the UI display screen 22. Note that in certain implementations, functions of the rendering module 36 may be implemented client-side on the client system 12.

The GUI module 36 communicates with a controller 38, which facilitates interfacing and handling communications between various modules 18, 34, 36, 40, 42, 44 of the data analysis software 16. The controller 38 further communicates with a configuration module 44, an integrated analytics and search engine module 40, a pivot grid module 34, a tree structure module 18, and an runtime in-memory data 42.

The configuration module 44 includes computer code adapted to provide functionality for enabling managers or administrators to setup data components and models and configure system settings during a configuration mode.

The analytics and search engine module 40 includes computer code that integrates analytics and search functionality, enabling users to trigger data searches and/or filtering operations. The analytics and search engine module 40 is adapted to enable analytics to drive search results and vice versa, as discussed more fully below.

For the purposes of the present discussion, a data search may be any process whereby a selection of data from a larger set of data based on a criterion or criteria, often called the search criteria, query parameter, or filter parameters. Note that for the purposes of the present discussion, a filtering operation may represent a type of data search. However, the term "filtering" often used when the criteria involves specification of one or more data dimensions to exclude or include in particular returned results. Furthermore, note that a collection of different searches and filtering operations and data manipulations initiated by a user so as to find particular information is also called a data search, or simply search herein.

The pivot grid module 34 includes computer code for generating pivot grids and making adjustments to the pivot grids based on user manipulations, e.g., pivoting operations, initiated via the UI display screen 22. The pivot grid module 34 is adapted to generated SQL code, e.g., constructs or statements, such as rollup, grouping, joins, and so on, so as to facilitate retrieval of fresh data from the database 20 for display in the pivot grids and analytics 26. The pivot grid module 34 communicates with the tree structure module.

The SQL statements 28 of the pivot grid module 34 are generated with reference to tree tables 48 of the tree structure module 18 and accompanying tree tables 48. The SQL statements 28 generated by the pivot grid module 34 are also accessible to the tree structure module 18. The tree structure module 18 further communicates with the controller and backend database 20.

The tree structure module 18 maintains tree tables 48, including metadata tree tables 50 and flattened temporary tree tables 52. The metadata tree tables 50 maintain tree structure metadata characterizing a data component or object to be searched and/or manipulated or otherwise used by the system 10. Note that data for leaves of a tree hierarchy of a data component is maintained in the backend database 20, as are dimension labels. A predetermined data component, e.g., as established during system configuration, may represent a structure inherent in the database 20, which may include many tree hierarchies and data relationships.

The flattened temporary tables 52 may represent tables whose fields represent leaf nodes of a tree structure, where column headers and/or row headers or labels represent hierarchical arrangements of dimensions, where labels of the headers correspond to different nodes of the tree structure. Those skilled in the art will appreciate that such a flattened table may be returned from the database 20 in response to certain SQL statements or collections of statements, such as select, rollup, grouping, cube, and/or collections thereof.

In certain embodiments, the leaf nodes may represent transaction totals returned via rollup constructs. Note that inner join constructs may be used to implement filtering operations using SQL-specified predicates corresponding to filtering and/or other search criteria, which may be user specified via the user interface display screen 22, e.g., via the search UI controls 24 and/or displayed dimensions and/or associated displayed hierarchy of dimensions available via the displayed tree hierarchy 30 for dragging and positioning onto displayed pivot grids and/or analytics 26.

In an example scenario, the analytics and search engine 40 detects searches, filtering operations, and pivot grid manipulations initiated via the UI display screen 22. The analytics and search engine 40 then employs information characterizing the detected operations and/or manipulations to format corresponding signals for use by the pivot grid module 30 to facilitate implementing the operations, e.g., handling requisite data flow to and from the database 18.

The flattened temp table data used for a particular operation may be maintained as in-memory data 42 at runtime. For a particular search or filtering operation, SQL statements are built, e.g., by the pivot grid module 30, using the hierarchy information, as reflected in the tree metadata tables 50, identifying the locations of sought leaf data in the database 18.

The tree structure module 18, which may also be called a Tree Access Manager (TAM), may be implemented via one or more Application Programming Interfaces (APIs), which may provide software routine libraries and associated routines, which are callable via the pivot grid module 34, to selectively pull data from the database 20 and return any updated data back to the database 20 for storage thereby.

The SQL statements, such as grouping and rollup statements, are usable by the tree structure module 16 to retrieve flattened temporary tree table data 52 from the database 18. The leaf data from the flattened temp tree tables 52 is then displayable in fields of pivot grids 24, e.g., after processing via the pivot grids and analytics rendering code 34 and used by the analytics engine 40 to construct analytics. Computer code for facilitating rendering the analytics and pivot grids may be forwarded to the GUI module 36 for further processing and formatting into rendering instructions which may be usable by a browser of the client system 22 to render the UI display screen 22.

Hence, a pivot grid search, filtering, and/or pivoting operation initiated via user interaction with the UI display screen 22 triggers generation of instructions by the analytics and search engine 40, with reference to the configuration information 44. The instructions are passed to the pivot grid module 34 for conversion into SQL statements and associated queries (e.g., SQL select statements) with reference to tree metadata characterizing the pivot grid and predefined data component characterized by the metadata tree tables 50. Note that the metadata tree table 50 may be updated as needed, e.g., during system configuration mode, and/or automatically in accordance with user manipulations implemented by certain UI controls 32 (e.g., during a use mode), as may be accessible via one or more action menus and accompanying user options, as discussed more fully below.

The tree structure module 18 may access the database 20 using SQL (with reference to predefined tree metadata specifying hierarchy information) in response to a signal from the pivot grid module 34 to get data for the temporary tables 52 (also simply called temp tables), i.e., flattened tables with the transaction data (representing tree structure leaf data), as may be returned via SQL statements. Note that exact SQL code and accompanying statements used are implementation specific and may vary.

Those skilled in the art with access to the present teachings may readily determine which SQL constructs and associated statements to use for a given implementation and how to generate them, without undue experimentation, so as to meet the needs of a given implementation.

The pivot grid module then signals the tree structure module 18 to perform particular joins (for filtering) and/or groupings and rollups with the one or more flattened temp tables 52 to implement the user initiated transaction search/query that arose from user manipulation of or interaction with the pivot grid(s) 26 or from user specification of a search parameter or other filtering criteria.

Note that conventionally, data to be manipulated or searched is stored in a cached data object or OnLine Analytical Processing (OLAP) cube, and data is not dynamically retrieved via SQL into a pivot grid by employing a hierarchical tree of metadata 50 specifying the hierarchical structure to be exhibited by the pivot grid, as is done in the present example embodiment. Use of the tree structure module 18 as discussed herein enables the backend database 20 to replace a cache, thereby helping to ensure that data retrieved for use in pivot grids and analytics 26 remains fresh.

By using temporary tables 52 to maintain flattened data, i.e., tree structure leaf data (which may represent transaction data) retrieved from the backend database 20 using SQL queries (e.g., SQL constructs and associated code and statements, such as select statements, which may include SQL grouping statements, rollup statements, and so on), then inner joins (e.g., using SQL constructs and associated code and statements) may be used to facilitate implementation of search and related filtering and functional manipulation (e.g., data modification, performance of related actions, and so on) options.

For the purposes of the present discussion, transaction data may be any data characterizing or associated with a business object. A transaction may be any occurrence of one or more events related to a business activity and which may be grouped based on the business activity.

Hence, the system 10 is adapted to generate pivot grids and analytics 26 reflecting search results in accordance with computer code implemented via the analytics and search engine 40 and the pivot grid module 34, and with reference to tree structure hierarchies as represented via metadata maintained in tree tables 50.

The flattened temporary tree tables 52, also called tree select tables (e.g., as obtained from the backend database 20 via SQL select statements) may represent or illustrate data from one or more lowest levels in a tree hierarchy described by the metadata tree tables 50. Inner joins may be used to selectively combine data from the tree metadata tables 50 (also called tree node tables) and the flattened temporary tables 50 (also called tree select tables).

Accordingly, the temporary tree tables 52 represent flattened versions of the metadata tree tables 50, but containing leaf data corresponding to the lowest level(s) in the tree hierarchy characterized by the metadata tree tables 50. The pivot grid module 34 is adapted to call one or more software routines or methods of the API used to implement the tree structure module 18, so as to facilitate implementing inner joins between leaf data maintained in the flattened temporary tree tables 52 and the hierarchy information of the metadata tree tables 50.

For the purposes of the present discussion, an inner join may be any operation used to selectively combine data from different dimensions (e.g., column values of two tables) based on one or more join predicates, i.e., conditions or criteria, to produce a result, often called the result table. SQL INNER join statements may be used to implement inner joins. However, those skilled in the art will appreciate that mechanisms other than SQL inner joins may be employed to meet the needs of a given implementation, without departing from the scope of the present teachings.

When data retrieved from the database 20 is stored in the flattened temporary tree tables 52 is associated with hierarchy information maintained in the metadata tree tables 50, the tree tables are said to be reverse mapped to the data maintained in the flattened temporary tree tables 52. The reverse mapping of the tree hierarchy information 50 enables the pivot grid module 34 to properly organize data in pivot grids and analytics 26 in accordance with the relationships maintained in the metadata tree tables 50.

Hence, the tree metadata tables 50 contain the tree hierarchy information, while the tree select tables 52 contain flattened data for one or more leaves of a tree hierarchy, i.e., tree structure, characterized by hierarchical relationships reflected in metadata stored in the metadata tree tables 50. The tree hierarchy represented via the metadata tree tables 50 is used for a pivot grid model implemented via the pivot grid module 34 and used to display the pivot grids and/or analytics 26.

SQL programming language constructs and statements are employed by tree structure module 18 to retrieve data from the database 20 based on signaling from the pivot grid module 34. The signaling indicates data applicable to a query or pivot grid manipulation or user interaction. The retrieved data populates the flattened temporary tree tables 52 with fresh leaf data pertaining to leaves on the tree characterized by the metadata tree tables 50 and subject to the user interactions, e.g., initiated search or filtering operation, as initiated via one or more UI controls of the UI display screen 22.

In summary, SQL is used via the pivot grid module 34 on tree data pulled from the database 20 via the tree structure module 18 (Tree Access Manager (TAM) API) to organize the data for presentation in an updated pivot grid and/or analytic 26. This process involves reverse mapping of the tree hierarchy to data returned by the database for rendering hierarchically in the pivot grid.

To implement certain operations, e.g., operations that return transaction totals for use as leaf data in the flattened temporary tree tables 52, the tree structure module 18 (in response to signaling from the pivot grid module 34) may generate an SQL select statement that includes a rollup operator, which represents an example SQL programming language construct. The select statement is generated based on metadata objects of the metadata tree tables 50.

The rollup operator facilitates generating reports containing subtotals and totals, i.e., the rollup operator generates results that include aggregates or sums for a hierarchy of values in one or more selected columns. Hence, the rollup operator may be employed to obtain subtotals for the lowest level(s) (i.e., leaf levels) to be characterized by dimensions (e.g., column axis) of pivot grids 26. Those skilled in the art will appreciate that other SQL operators or constructs, e.g., CUBE operators, may be employed to meet the needs of a given implementation, without departing from the scope of the present teachings.

Hence, the pivot grid module 34 is adapted to retrieve the latest tree structures from the tree tables 48 and utilize the power of databases (e.g., the database 20), such as relational databases, e.g., Oracle, SQL Server, and so on. SQL constructs, such as rollup and grouping and grouping operators are employable to represent multi-dimensional data only using SQL queries and in memory data (e.g., data maintained in the runtime memory 42) manipulation at runtime.

Details of the various SQL statements may be generated with reference to a predefined query model, as may be set up by a manager or administrator (or other properly credentialed user) during configuration mode of the system 10. The query model may be characterized by a data model reflected via the metadata tree tables 50. Data for the model, which characterizes multi-dimensional data, is maintained in the database, such that leaf data for the multi-dimensional hierarchy (e.g., tree hierarchy) is retrieved via SQL from the database 20 without requiring a separate cache or OLAP cube.

In summary, the system 10 includes various features, which facilitate efficient data searches and manipulations without requiring caching. During configuration, a manager or administrator may select a tree to attach to a particular set of data, and then attach a tree name and tree node to associated a tree or sub-tree with a particular data set, dimension, or other property of data.

Pivot grids and analytics 26 may display one or more hierarchies for dimensions in its row, column, and/or filter axis without caching by attaching trees to dimensions in a configuration mode, e.g., using a pivot grid wizard. The hierarchy information may be captured as metadata in tree structures 50 and flattened to temporary tables 52 on the fly and be updated whenever required.

The pivot grid module 34 and/or tree structure module 18 may perform joins with the temporary tables 52 and employ constructs such as SQL rollup and grouping operators to obtain subtotals for the lowest levels of a dimension in a grid row or column axis. The tree hierarchy data 50 is reverse mapped to data returned by the database and then rendered hierarchically via pivot grids and/or analytics or associated visualizations 26. The SQL queries are dynamically executable against the database 20, such that the data retrieved represents data fresh from the database 20.

The tree structure module 18, as may be implemented via a TAM implemented via an API, is adapted to enable flattening of the tree structure metadata 50 and performing joins with the temporary tree tables 52, also called select tables. The tree structure module 18 may return a tree selector table, and an SQL WHERE criteria may be appended to the associated query.

The pivot grid query is joinable with the temporary table(s) 52 and the metadata tree tables(s) 50 (also called tree node table(s)) to facilitate constructing pivot grids 46 and related analytics, which may be derived from the pivot grids 46. The tree structure module 48 may include computer code for identifying hierarchies associated with particular trees.

Note that conventionally, queries are executed against cached or warehoused tables; not directly against the database (e.g., relational database). Accordingly, the data was not always fresh. Conventionally, caching may be employed to store data (retrieved from a database) in particular arrangements or structures (e.g., OnLine Analytical Processing (OLAP) cubes). The cached information is then manipulated using a calculation engine (also called analytics engine) and displayed in various ways during analysis.

However, cached data may become stale, not accounting for recent changes in data, unless potentially costly and time consuming caching is not repeatedly performed at short intervals. However, frequent caching of large datasets, as may be encountered in certain enterprise applications, can be prohibitively slow.

Accordingly, certain embodiments discussed herein overcome such limitations in part by employing SQL to retrieve fresh data from the database 20 based on the metadata tree tables 50 and signaling from the pivot grid module 34 (responsive to user interactions with the UI display screen 22). The retrieved data 52 is then properly organized for use in the pivot grids and analytics 26 with reference to relationships between the data, as specified by the metadata tree tables 50 (via reverse mapping.).

Hence, in the present example embodiment, it is not necessary to use data caching. Queries can be dynamically executed against the database 20 and the tree structure information (or other hierarchy information) can be retrieved and applied in real time. This can facilitate enabling hierarchical information to be used in dimensions of a pivot grid without caching. The resultant data can be up to date and more accurate than caching mechanisms. This approach can also use database SQL constructs like rollup to aggregate the transaction data and manipulate it accordingly.

The example system 10 facilitates implementation of various methods, including a method for facilitating viewing of data. For example, one method is adapted to be performed by one or more digital processors and includes following accepting a signal from a user input device to select a data set for viewing; accepting a signal from a user input device to select a hierarchy for viewing the data set; and using the selected hierarchy to organize the data when the data is displayed in subsequent analysis windows.

Figure 2:
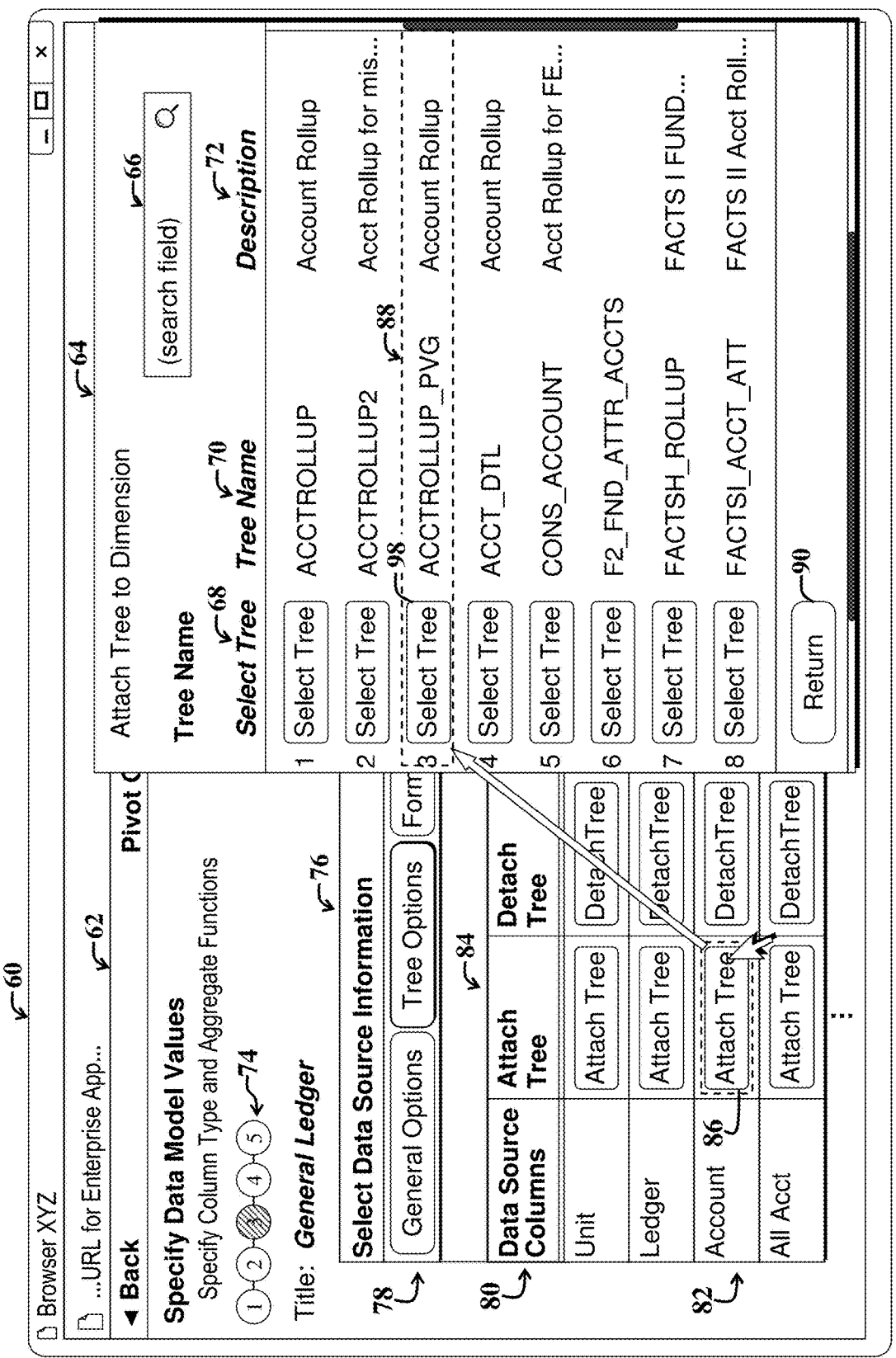
FIG. 2 illustrates a first example User Interface (UI) display screen, which may be generated via the system of FIG. 1, and which includes UI controls for attaching and detaching trees to a data component, dimension, or other set of data.

FIG. 2 illustrates a first example UI display screen 60, which may be generated via the system 10 of FIG. 1, and which includes UI controls 84, 86 for attaching and detaching tree structures (also simply called trees herein), i.e., representations thereof, to a data component, dimension, or other set of data.

For example, in FIG. 2, a user can select a tree to attach to a particular set of data. In this example, a tree for viewing account data 82 is selected via an attach-tree button 86 associated with an account data source. The user can select the desired tree by pressing on the corresponding select-tree button 98 associated with the particular tree, which corresponds to the tree named ACCTROLLUP_PVG in FIG. 2.

The example UI display screen 60 may represent a browser screen illustrating a webpage UI display screen 62, accessible by browsing to a Uniform Resource Locator (URL) or other network address identifier associated with the data analysis software 16 of FIG. 1.

The webpage UI display screen 62 illustrates an example pivot grid wizard screen section, which includes a step indicator 74, which indicates a particular step (e.g., step 3) of a sequence of steps implemented via the underlying wizard during a configuration mode of the system 10 of FIG. 1.

The webpage UI display screen 62 further illustrates a data-source selection table 76, which includes various user options 78, which may be implemented via buttons other UI controls, e.g., for accessing general options, tree options, formatting options, and so on. The data-source selection table 76 further illustrates options (as exemplified by the attach-tree button 86) in a body 82 of the table, where UI controls presented in the body 82 are arranged by data source, and function. The user options include options for attaching trees and detaching trees to a particular data component (which may also be called a data model herein).

An associated tree-listing window 64 illustrates various indications of trees by tree name 70 and description 72, along with tree selection options 68. The tree selection options enable a user to select a tree for association with a particular data component, e.g., upon user selection of a return button 90. A search control 66 provides a user option to enter a tree name to search for search for, where trees have been previously attached to a data model or component, for inclusion in a modified or additional data component to be used for search, analysis, and other uses, as discussed more fully below. The search control 66 is adapted to trigger filtering of the search results in the grid 76 based on the tree name entered.

Note that an account dimension 82, corresponding to a row of the data-source selection table 76, is to be associated with a selected tree (e.g., ACCTROLLUP_PVG tree). The tree can be key to presentation of dimension values, e.g., enabling determining how data is to be organized via pivot grids used to return search results, as discussed more fully below. A created tree may have various different dimensions (e.g., corresponding to different tree nodes), which facilitate retrieval of data, e.g., leaf data, for each dimension.

FIG. 3 illustrates a second example UI display screen 100 illustrating the pivot grid wizard section 62 without the associated tree-listing window 64, and further illustrating user options 104 for enabling association of a selected tree (e.g., indicated by the tree name 102) and a tree node (indicated by the "ALLACCOUNTS" label in the control 104 of a tree node column) with a dimension of a data source, e.g., component, dimension, or other set of data. In the present example embodiment, the significance of the tree node selection is that the data shown in the resulting pivot grid 76 contains only data related to that particular node. All the other data belonging to other nodes in the tree are filtered from the pivot grid. The second user interface screen 62 facilitates enabling a user to attach or associate a tree name and a tree node to with a particular data set, dimension, or other property of data.

Hence, a selected tree dimension (and/or associated tree), can be assigned to a particular node via use of one or more controls (e.g., search control 104) for searching for tree nodes. Alternatively, user selection of a search button of the search control 104 may trigger display of another dialog box with tree search and node search options for assigning a particular tree (or sub-tree) to a particular node, such as a node of a larger tree.

In the present example embodiment, the selected tree (indicated by the tree name 102). This tree 102 is for general related information for different accounts and identifies the tree structure from which data is retrieved in response to different search queries. Data from particular search queries or filtering operations may be retrieved from leaf data associated with the identified tree 102, which may represent the data component used for a particular user session (e.g., to search and analyze account data).

Figure 4:
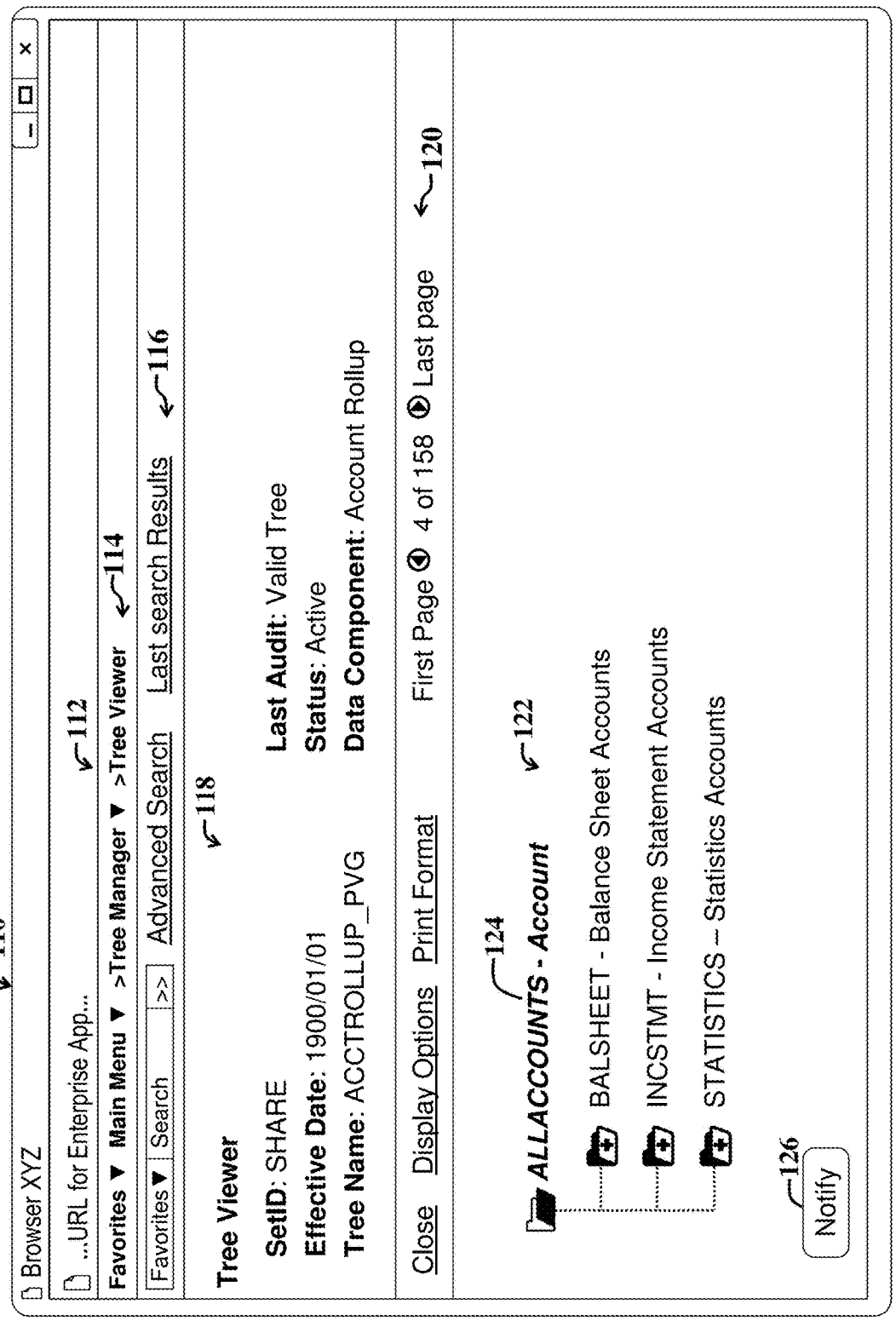
FIG. 4 illustrates a third example UI display screen, showing an example tree hierarchy for an accounts dimension of a data component.

FIG. 4 illustrates a third example UI display screen 110, showing an example tree hierarchy 122 for an accounts dimension of a data component (e.g., a data component represented by the ACCTROLLUP_PVG tree). The third example UI display screen 110 includes a tree viewer section 112, which shows a navigation bar 114, a control bar 116 with various UI controls, e.g., for triggering advanced search windows; for returning to the previous or last search results; for triggering a search for a tree to view; for adding a particular tree to a favorites tree collection, and so on.

The tree viewer section 112 further includes a tree-information section 118, which shows descriptive data for a particular named tree (ACCTROLLUP_PVG). Below the tree-information section 118, a second control bar 120 provides various UI controls, e.g., for closing a particular displayed tree 122, for adjusting display options, for adjusting print formatting, and for accessing different pages of available trees.

The tree 122 is shown below the second control bar 120 and illustrates a top level tree node 124 and a first level of the associated tree hierarchy. Displayed sub-nodes (e.g., BALSHEET, INCSTMT, and STATISTICS) are indicated via expandable controls that enable a user to view child nodes of each of the displayed sub-nodes. Different nodes may be further expanded until the lowest level along a particular branch of nodes reached, at which point leaf data is displayed.

An additional notify button 126 represents a user option for triggering display of another dialog box or UI display screen whereby a user may send an electronic message to a particular recipient, where the message is tagged with the indicated tree (e.g., ACCTROLLUP_PVG).

Figure 5A:
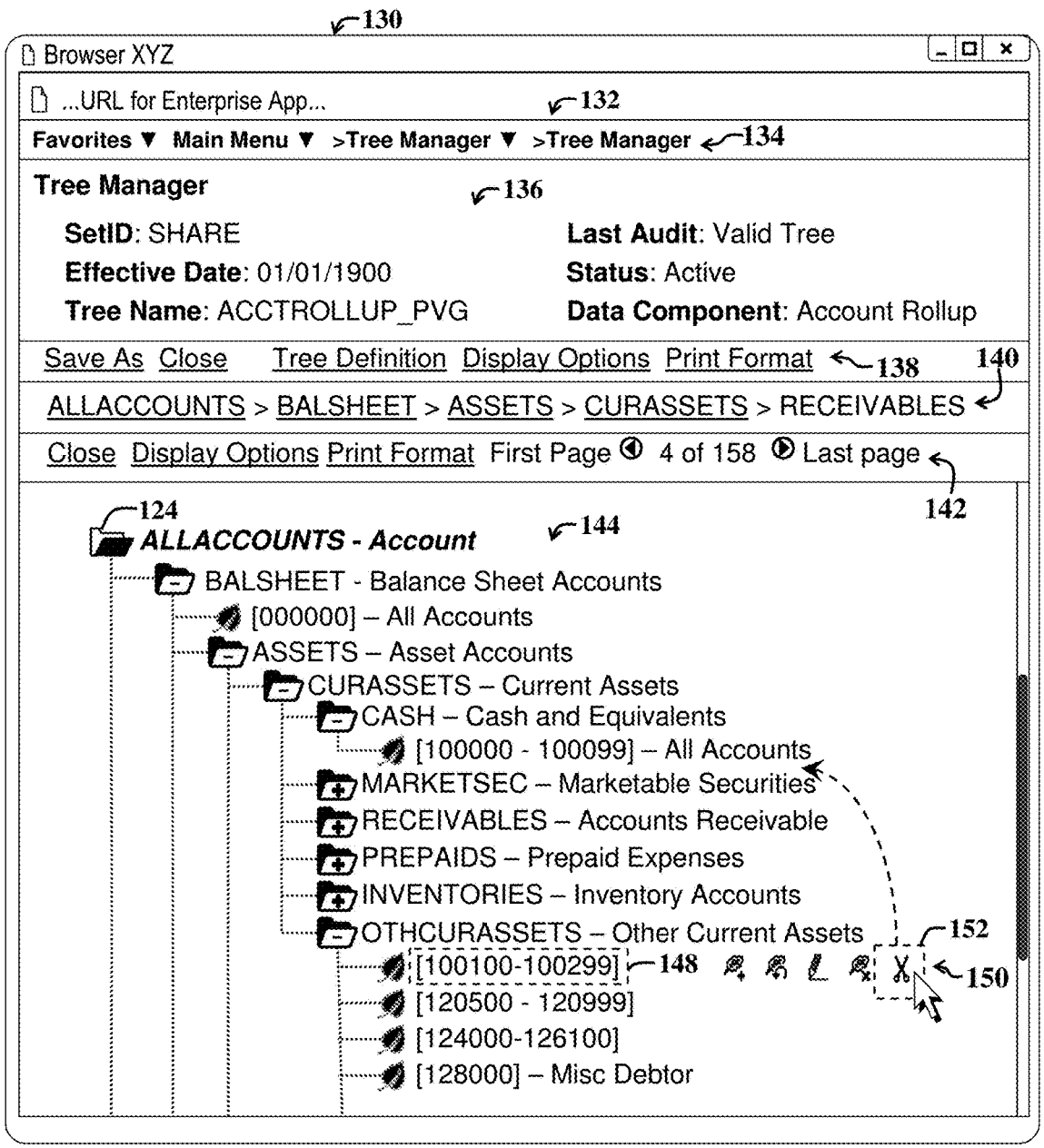
FIG. 5A illustrates a fourth example UI display screen with user options for manipulating or adjusting a tree, resulting in corresponding changes to an associated pivot grid.

FIG. 5A illustrates a fourth example UI display screen 130 with user options 150 for manipulating or adjusting a tree 144, resulting in corresponding changes to an associated pivot grid. The tree 144 shown in a tree manager section 132 represents a partially expanded version of the tree 122 of FIG. 4, where certain tree nodes have been expanded, while other tree nodes remain not expanded.

The tree manager section 132 represents a UI display screen of a tree manager, as indicated in a navigation bar 134. Tree identifying information and other characteristics are shown in a tree-information section 136. Various user options 138-142 enable users to view tree definitions, display tree options, access print formatting options, close a tree, navigate to another tree, access different pages that may show different trees, and so on.

In the present example embodiment, a user selects particular leaf data 148, which then activates display of UI controls 150 for manipulating the leaf, such as by repositioning the leaf. For example, in the present scenario, a user employs a cut option 152 to cut and paste the leaf 148 from its current hierarchical position to another position in the tree 144, e.g., to a position below an all accounts leaf, such that the leaf 148 becomes a child of a CASH node.

A pivot grid corresponding to or representing the tree before the leaf repositioning implemented via use of the cut and paste control 152 is shown in FIG. 5B.

FIG. 5B illustrates a fifth example UI display screen 160 showing a pivot grid 164 corresponding to the tree of FIG. 5A before adjustments are made to the tree 144 thereof. The pivot grid 164 shows leaf data 168 and aggregate data 166 for various hierarchically arranged dimensions 162, which correspond to nodes of the tree 144 of FIG. 5A.

The repositioning operation implemented via the cut and paste control 152 of FIG. 5A will result in repositioning of a block of data 170 corresponding to the selected leaf 148 shown in FIG. 5A, as discussed more fully below with reference to FIG. 5D.

Figure 5C:
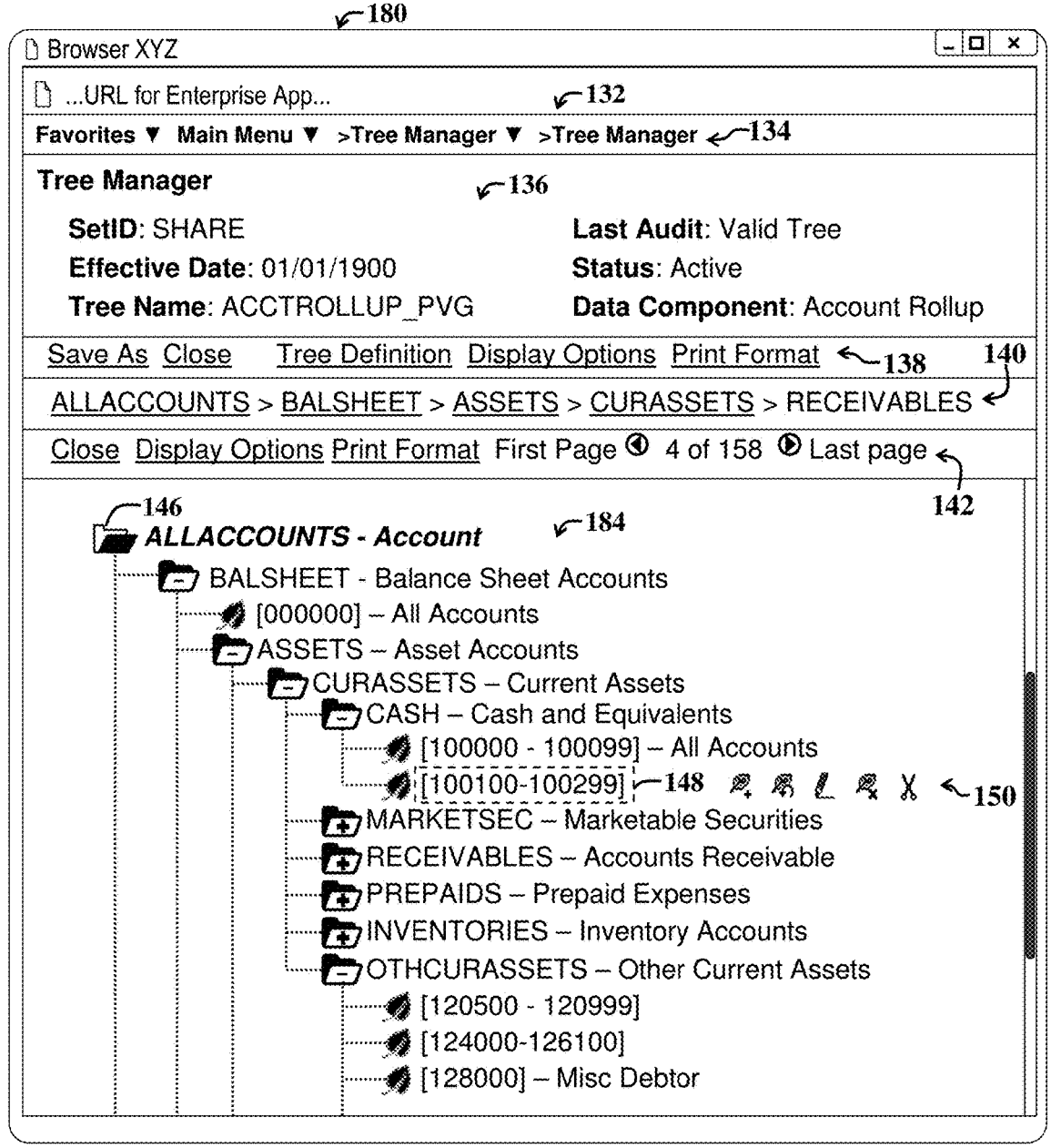
FIG. 5C illustrates a sixth example UI display screen showing an adjusted tree after adjustments are made to the tree of FIG. 5A.

FIG. 5C illustrates a sixth example UI display screen 180 showing an adjusted tree 184 after adjustments are made to the corresponding tree 144 of FIG. 5A. The updated tree 184 shows that the leaf 148 has been repositioned as a child node of a CASH node after the cut and paste operation performed via the cut and paste control 152 shown in FIG. 5A.

FIG. 5D illustrates a seventh example UI display screen 190 showing an adjusted pivot grid 194 corresponding to the adjusted tree 184 of FIG. 5C. With reference to FIGS. 5A-5D, the section of data 170 corresponding to the selected leaf 148 of FIGS. 5A and 5C has been repositioned in in the updated pivot grid 194. A hierarchical structure 192 characterizing the pivot grid 194 is updated accordingly, as is the positioning of the associated leaf data. The aggregate data 166 of FIG. 5B is also updated to reflect changes in the hierarchy.

Underlying metadata characterizing or describing the hierarchical structure 192 is then saved and usable for constructing subsequent SQL queries to a backend database (e.g., the database 20 of FIG. 1) when using a data component characterized by the tree 194.

Hence, various accounts are shown in the hierarchical structure 194, which may represent a tree table and/or type of pivot grid. Before implementing data search and analysis operations, the tree 194 is configured, i.e., predefined, as desired.

The leaf data of the tree table 194 (shown in the table body) contains values that may be employed and subsequently used in displays of search results, including search results displayed via pivot grids, trees, and/or other analytics, as discussed more fully below with reference to FIG. 6. Such displayed analytics leverage hierarchy information represented by the hierarchical structure 192 as well as the table body data, i.e., leaf data and aggregate data.

The example tree table 194 may be flattened and joined with a specification of a query to facilitate retrieving data from the backend database 20 of FIG. 1 and displaying the search results in accordance with appropriate hierarchical relationships defined by the hierarchical tree structure 192.

In general, two categories of SQL code may be employed to selectively retrieve data from a database. One category of SQL code obtains dimension values and relationships represented via the hierarchical tree structure 192, and another category of SQL code is adapted to facilitate retrieval of actual leaf data for a particular pivot grid or analytic to be displayed.

Figure 6:
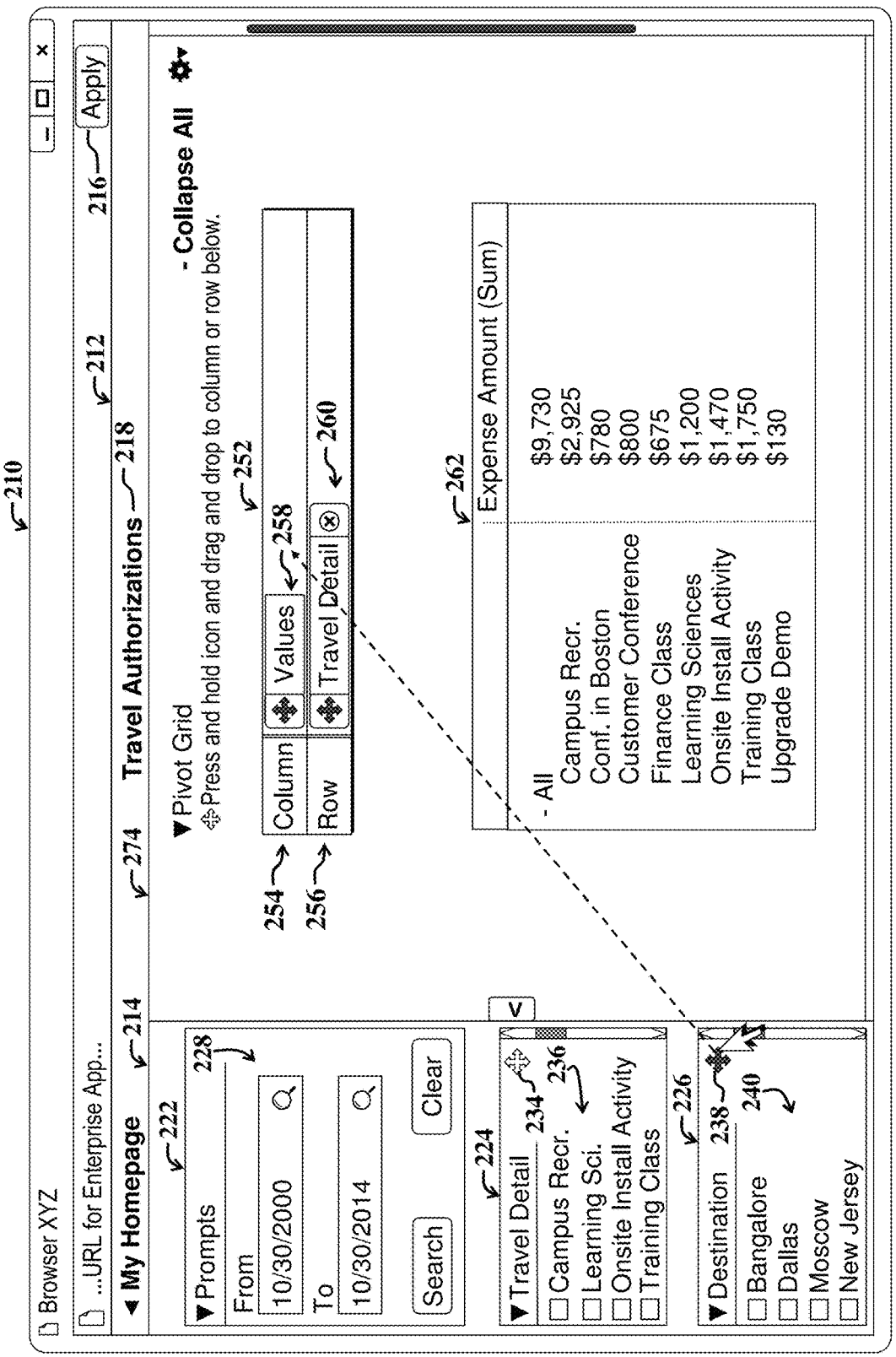
FIG. 6 illustrates an eighth example UI display screen showing both a tree hierarchy and pivot grid, with user options for adjusting the pivot grid and tree by dragging and dropping data dimensions onto a pivot grid.

FIG. 6 illustrates an eighth example UI display screen 210 showing both a tree hierarchy 262 and pivot grid 252, with user options 222-240, for adjusting the pivot grid 252 and tree 262 by dragging and dropping data dimensions (represented by different sections 224, 226) onto the pivot grid 252.

The example UI display screen 210 accesses a different data component than discussed with respect to FIGS. 5A-5D. In particular, the underlying data component represents a travel authorizations component, as indicated via a label 218 of a travel authorizations section 212.

The example travel authorizations section 212 includes a search control section 214 and a search results section 274. The search control section 214 includes a search prompt section 222, with user options 228 for specifying date ranges for filtering data to be displayed in accordance with a specified date range, which represents a type of search criteria.

The search control section 214 further includes a travel detail section 224, which represents a dimension (which may include sub-dimensions, and which may represent a sub-tree, also called a child tree, of an underlying travel authorizations data component). A first drag-and-drop control 234 represents a user option to select and drag the section 224 to a column 254 or row 256 of the pivot grid 252.

The travel detail section 224 further includes various user options (via check boxes) 236 for selecting child dimensions of the travel detail dimension represented by the travel detail section 224. Upon user selection of one or more of the travel detail child dimension user options 236, any remaining unselected child dimensions are filtered out from search results displayed via the pivot grid 252 and/or associated tree or table 262. Alternatively, selected child dimensions are filtered out from the displayed search results.

Similarly, a destination section 226 illustrates various user options 240 for selectively filtering displayed search results based on destination location. In the present example scenario, a user selects a second drag-and-drop control 238 and moves it to a column position of the pivot grid 252. The pivot grid 252 then automatically adjusts, i.e., pivots, in accordance with the additional dimension added to the pivot grid 252.

Before positioning of the destination dimension or a representation thereof (corresponding to the destination section 226) in the pivot grid 252, the pivot grid shows a values dimension 258 in the pivot grid column section 254, and further shows a travel detail dimension 260, which has been previously positioned in the row section 256 of the pivot grid 252.

Note that while only representations 224, 226 of a travel detail dimension and destination dimension are shown in the search control section 214, other dimensions and associated sections characterizing the underlying travel authorizations data component may be accessible, such as by scrolling the search control section 214.

After the user has dragged the destination dimension section 226 to the pivot grid 252, the associated drag-and-drop control 238 may change color to indicate that it has been positioned in the pivot grid 252. Furthermore, the column section 254 of the pivot grid 252 will be adjusted to show a button representing the associated destination dimension.

After the user has finished manipulating the pivot grid 252, an apply button 216 may be selected. In the present example scenario, user selection of the apply button 216 triggers display of associated analytics, e.g., as discussed more fully below with reference to FIG. 7.

Figure 7:
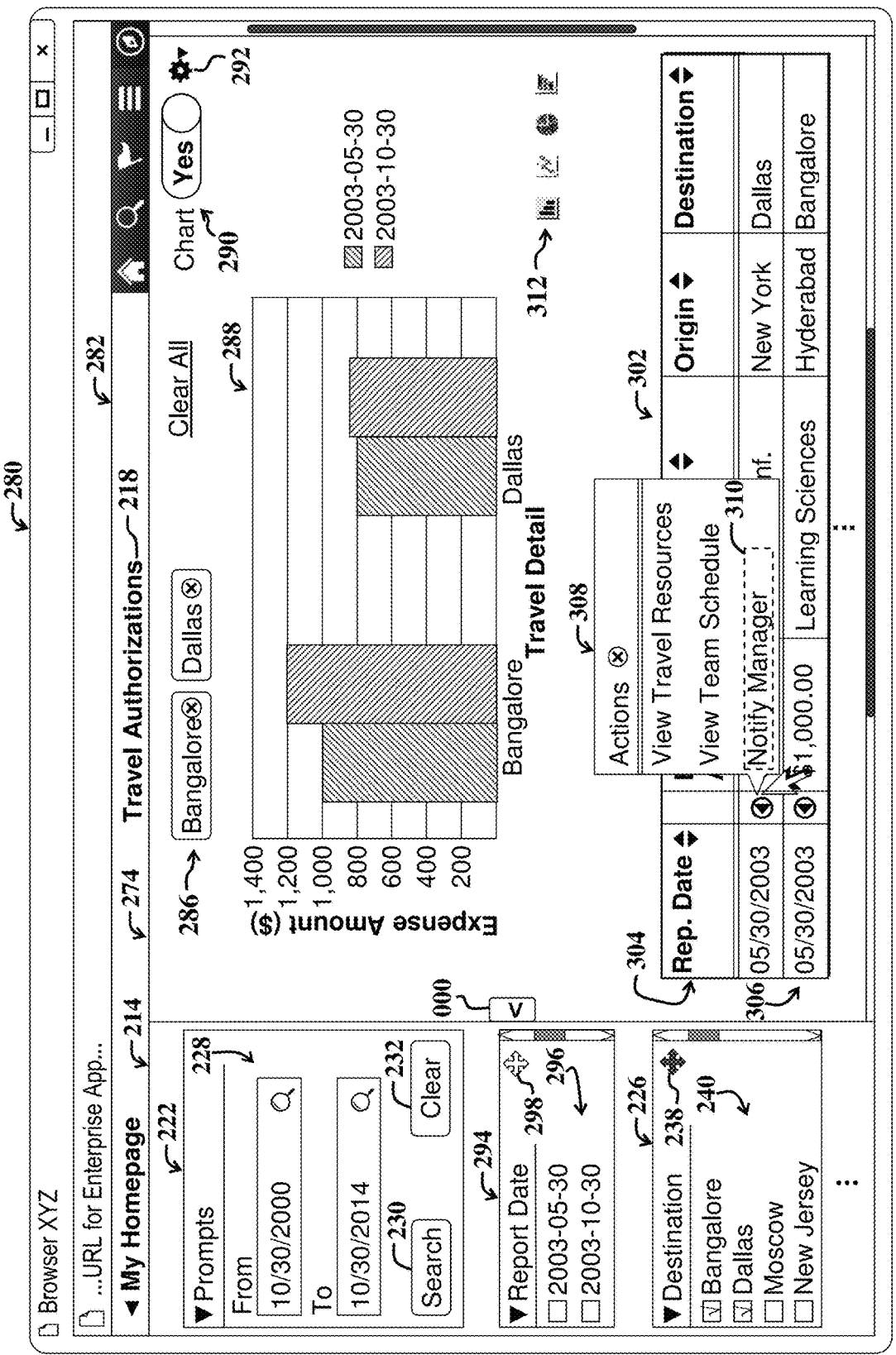
FIG. 7 illustrates a ninth example UI display screen, appearing after a user has adjusted pivot grid dimensions and filters, and after selection of an apply button from the eighth example UI display screen of FIG. 6.

FIG. 7 illustrates a ninth example UI display screen 280, appearing after a user has adjusted pivot grid dimensions and filters, and after selection of an apply button from the fifth example UI display screen 210 of FIG. 6.

The updated search results section 214 has been scrolled to show an additional report date section 294 with a drag-and-drop control 298 and associated date-selection controls 296. In the present example embodiment, since none of the date selection controls 296 are selected as facet filters, all of the dates indicated via the controls 296 are included among search results in the updated search results section 274.

The destination section 226 is shown with Bangalore and Dallas check boxes selected from among the destination-selection options. Accordingly, only Bangalore and Dallas results are shown among the search results of the updated search result section (e.g., as indicated in a destination column of a results table 302).

The updated search results section 274 includes a displayed chart 288 along with indications of used destination-location dimensions 286, which correspond to the user selections made via the controls 240 of the destination section 226.

The chart 288 displays expense amount versus travel detail, where the travel detail is limited to Bangalore and Dallas, corresponding to the used dimensions 286. Note that the chart 288 may be changed, such as to a line graph, a pie chart, a horizontal bar chart, etc., via use of chart-type controls 312.

A chart toggle control 290 facilitates toggling between display of the chart 288 and an associated pivot grid used to generate the chart 288. Additional user options, e.g., chart options; options to save a session and associated data, and so on, may be user accessible via a session drop-down menu control 292.

The accompanying results table 302 illustrates transaction data 306 in a table body, which is organized by various applicable dimensions 304 corresponding to columns of the search results table 302.

In the present example embodiment, a user has selected an actions control accessible via the search results table 302 to trigger display of an example actions menu 308. The example actions menu 308 is automatically populated with user options (e.g., to view travel resources; view team schedule, and notify a manager) that are applicable to the displayed search results 306.

The rows of search results 306 of the search results table 302 may represent particular transactions or tree structure leaves. User selection of one or more of the rows 306 may trigger display of an associated transaction page or other page, which may include UI controls for adjusting or modifying underlying data and/or for implementing additional actions related to the underlying leaf data.

In the present example embodiment, a user selects to notify a manager by selecting a notification option 310 from the actions menu 308. This may trigger display of a subsequent dialog box or UI display screen for facilitating sending an electronic message to a manager applicable to the business object corresponding to the travel authorizations component used to perform travel authorization searches and display associated search results, e.g., via the chart 288 and associated search results table 302.

Figure 8:
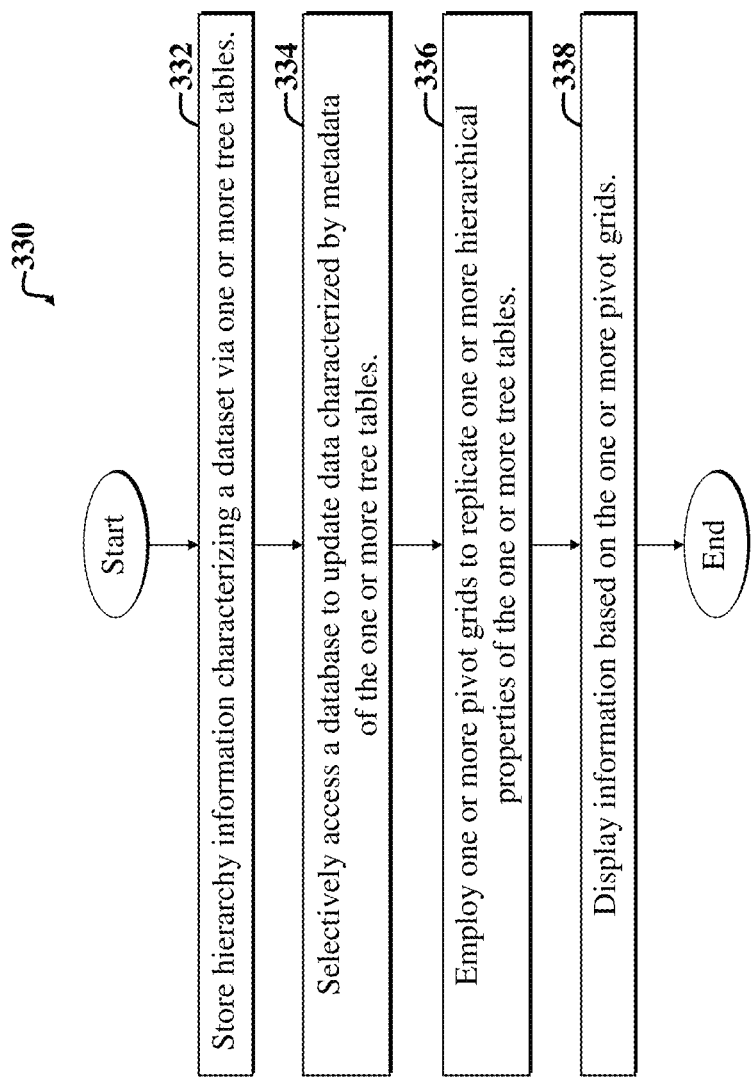
FIG. 8 is a flow diagram of a first example method adapted for use with the embodiments of FIGS. 1-7.

FIG. 8 is a flow diagram of a first example method 330 adapted for use with the embodiments of FIGS. 1-7. The example method 330 facilitates transforming, updating, or otherwise using or manipulating data in an enterprise computing environment. The example method 330 is adapted to be executed by one or more servers of a server system running webpage software accessible to one or more client devices in communication with the server system.

The first example method 330 includes a first step 332, which involves storing hierarchy information characterizing a dataset via one or more tree tables. The hierarchy information may include information specifying relationships between data dimensions of a preconfigured data component (e.g., business object), which may be configured by a developer, manager, or other authorized personnel operating the underlying system in one or more configuration modes. The hierarchy information may enable reconstruction of a representation of a tree structure, wherein the tree structure exhibits a hierarchical arrangement of nodes in accordance with the hierarchy information.

A second step 334 includes selectively accessing a database (e.g., the backend relational database 20 of FIG. 1) to update data characterized by metadata of the one or more tree tables. The metadata may represent or include the hierarchy information stored in the first step 332. The one or more tree tables may include tables with column and/or row headers nested in accordance with the hierarchy information specified via the database. The one or more tree tables may also include so-called flattened tree tables, which may contain leaf data returned from the database via SQL code, which may include, for example, select statements. Accordingly, the flattened tree tables are sometimes called select tables herein.

A third step 336 includes employing one or more pivot grids to replicate one or more hierarchical properties of the one or more tree tables. The pivot grids may be stored or maintained digitally, e.g., via runtime memory, in advance of delivery to one or more client devices.

A fourth step 338 includes providing information (e.g., rendering instructions and/or information used to generate rendering instructions) based on the one or more pivot grids. The provided information is adapted to be displayed via one or more client devices.

The method 330 may be augmented or otherwise altered without departing from the scope of the present teachings. For example, the fourth step 338 may further include using the one or more pivot grids to generate and display an analytic.

An additional step may include employing one or more SQL constructs to represent multi-dimensional data included in the one or more pivot grids by using one or more SQL queries. The one or more SQL queries may be dynamically executed against the database such that when data in the database changes, corresponding data in the one or more tree tables is automatically updated.

One skilled in the art may readily determine which SQL constructs and how to implement them in SQL code for dynamically executing queries or data collection operations to selectively retrieve (in accordance with search or filer criteria) data from the database in accordance with a given implementation, without undue experimentation.

The one or more SQL constructs may include, for example, an SQL rollup construct. The SQL rollup construct may be employed to generate aggregate data (e.g., data involving totals of or other combinations of leaf data of a tree structure characterizing a data component being searched or filtered). Those skilled in the art will appreciate that computer code including the SQL rollup construct may also include one or more SQL grouping constructs.

The example method 330 may further include, or be interchanged or replaced with another method, which includes: representing a set of data via a first hierarchical tree structure; employing the first hierarchical tree structure to generate a first set of one or more tables of data characterizing data of the set of data; receiving user input indicating one or more operations to be performed on the first set of one or more tables; performing the one or more operations on the first set of one or more tables, resulting in an updated second set of one or more tables in response thereto; and using the updated second set of one or more tables to generate a second hierarchical tree structure reflecting a change in an arrangement of data responsive to the updating of the first set of one or more tables.

The hierarchical information characterizing the first hierarchical tree structure may be maintained or stored as metadata characterizing hierarchical relationships between nodes (e.g., data dimensions), including leaves of the tree structure.

The one or more operations performed on the first set of one or more tables, which may include one or more tree tables, may involve use of one or more pivot grids. For the purposes of the present discussion, a tree table may be any table or grid, whose organization of column and or row headers illustrate a hierarchical order of dimensions, where each dimension may correspond to a node of a corresponding tree structure. In some embodiments, a tree table can include a display that shows a tree in a table. In some tree tables the first column shows the tree and rest of columns can display additional data besides the tree. However, other variations are possible. Typical examples of applications that may use a tree table include file management interfaces, e-mail clients, etc.

The one or more operations may include a join operation (e.g., using an SQL join construct), which may involve joining or selectively combining two or more tables of the first set of one or more tables of data. The selective combination may be performed in accordance with a join predicate.

Data of the updated set of one or more tables may be mapped to a pivot grid that reflects a hierarchical arrangement of data included in the updated set of one or more tables.

The first example method 330 may further include one or more steps that are adapted to be implemented on a client device; not limited to a server system. For example, the first example method 330 may further include providing a user option (e.g., via one or more UI controls) to manipulate data of the pivot grid, and using an SQL construct to facilitate manipulating data of the pivot grid in response to user selection of the first user option.

The first example method 330 may further include displaying an analytic illustrating data of the pivot grid, and providing a user option to modify the analytic. Modifications to the analytic may trigger automatic updating of the pivot grid and the first hierarchical tree structure to reflect the modifications.

The first example method 330 may further include mapping hierarchical data dimensions of the second hierarchical tree structure to one or more dimensions of the pivot grid, and implementing the mapping without caching data identified by metadata nodes of the first or second hierarchical tree structures.

The one or more operations to be performed on the one or more tables may include a rollup operation (e.g., representing execution of an SQL rollup statement or collection of statements). The rollup operation may be employed to obtain one or more subtotals for one or more lowest levels of a dimension of the pivot grid.

A hierarchy represented via a pivot grid may be updated, such as in response to user selection of an option to attach a hierarchical tree structure to a dimension of the pivot grid, and then mapping the attached hierarchical tree structure to the dimension of the pivot grid.

Note that conventionally, certain conventional enterprise applications, e.g., Business Intelligence (BI) enterprise applications, require data to be cached from a database before being searched or analyzed. The cached data, which may represent OnLine Analytical Processing (OLAP) cubes or data warehouses that are separate from the backend relational database 20, may be characterized by dimensions and hierarchies defined at design time, and may remain static throughout analysis of data maintained via the cached cube. Any enabled slicing and dicing of the cached data is often performed by an underlying calculation engine that accesses the cached data. However, such cached data may become old or stale and may not necessarily reflect updated or recent transaction data.

Various embodiments discussed herein, including the first example method 330 are adapted to overcome such limitations, such as by enabling dynamic execution of SQL queries against the backend database, e.g., relational database. Accordingly, when data in the database changes, SQL queries may be dynamically executed against the database, whereby when data in the database changes, corresponding data in the one or more tree tables is automatically updated when the data is to be retrieved for display and/or analysis or modification. Configuration information for a particular tree is referenced to determine how to retrieve data directly from the database without caching.

Figure 9:
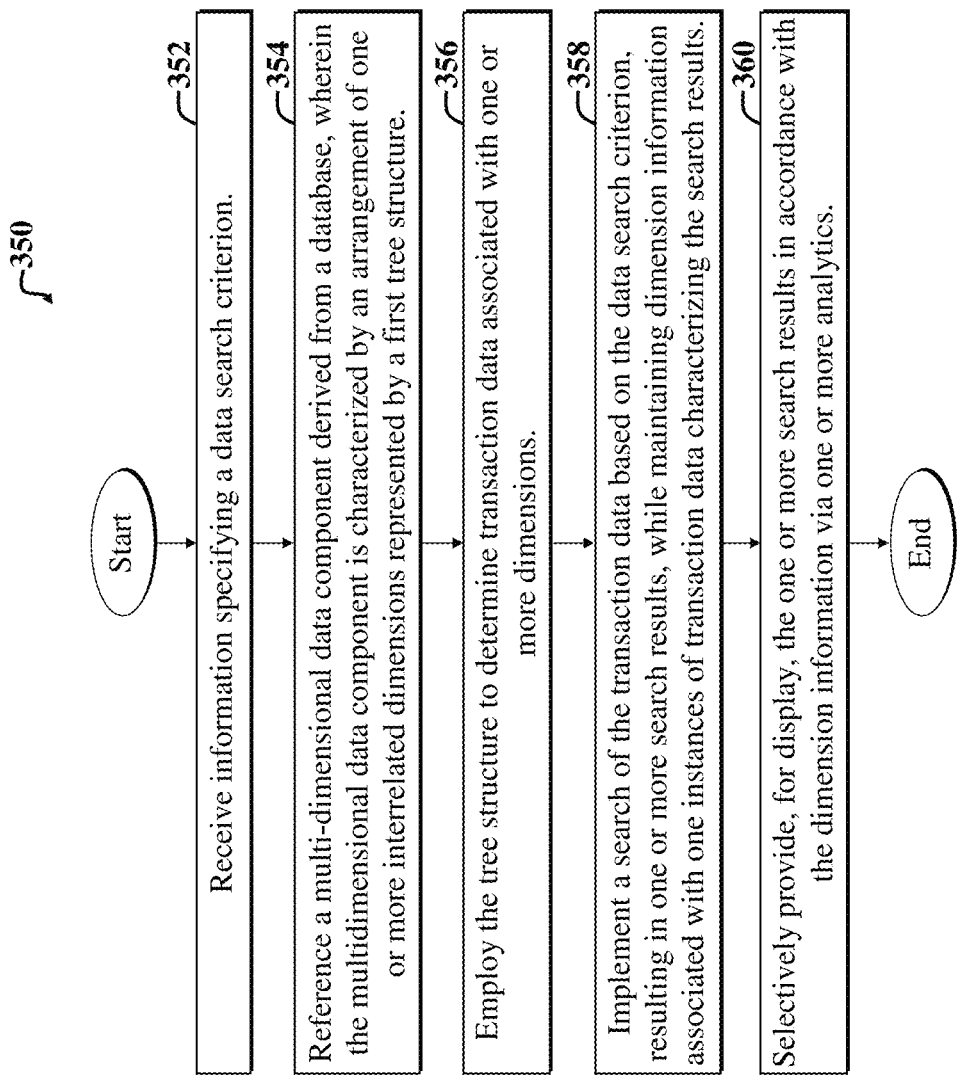
FIG. 9 is a flow diagram of a second example method adapted for use with the embodiments of FIGS. 1-8.

FIG. 9 is a flow diagram of a second example method 350 adapted for use with the embodiments of FIGS. 1-8. The second example method 350 is adapted to facilitate transforming a set of data, and then presenting the transformed data via a user interface display screen. The second example method 350 may be executed on one or more servers of a server system The second example method 350 includes an initial information-gathering step 352, which involves retrieving information specifying a data search criterion, which may include a filtering criterion.

A subsequent data-referencing step 354 includes referencing a multi-dimensional data component derived from a database, wherein the multi-dimensional data component is characterized by an arrangement of one or more interrelated dimensions represented by a first tree structure.

Next, a tree-structure-utilization step 356 includes employing the tree structure to determine transaction data associated with one or more dimensions.

A subsequent search step 358 includes implementing a search of the transaction data (e.g., data maintained via one or more business objects and pertaining to an enterprise business related activity) based on the data search criterion, resulting in one or more search results, while maintaining dimension information associated with one instances of transaction data characterizing the search results.

Finally, a display configuring step 360 includes providing (e.g., to a client device for subsequent display) the one or more search results in accordance with the dimension information via one or more analytics.

The method 350 may be augmented or otherwise altered, without departing from the scope of the present teachings.

For example, the method 350 may further include integrating pivot grid data with chart or analytics settings data, which is then packaged for display via a client device.

The second example method 350 may further include flattening a tree to facilitate obtaining data for one or more pivot grids, and using SQL code to reference tree metadata to capture hierarchy information associated with each data element corresponding to a leaf of the tree structure (e.g., by using inner join operations).

Tree structure data may be flattened on the fly, as opposed to cached in a cube. Configuration information for a particular tree structure may be referenced to determine how to retrieve data directly from the database without requiring any additional intermediate caching of data.

Information used to construct SQL statements (e.g., via automatic, i.e., dynamic SQL code generation) may be obtained from hierarchical information, which may be included in one or more tree tables, including a tree table representing a flattened tree structure.

Accordingly, the backend database (e.g., the database 20 of FIG. 1) may effectively replace use of a separate cache that is conventionally employed, but that may result in use of stale data for search and analysis operations.

The second example method 350 may further include providing a user option to select a tree to attach to a particular set of data, and providing another user option to attach a tree name and a tree node to associate a tree structure with a particular data set, dimension, or other property of data.

Pivot grids may then display a hierarchy for dimensions in its row, column and/or filter axis without caching, by attaching trees to dimensions via use of computer code associated with a pivot grid wizard.

The second example method 350 may further include capturing hierarchy information as metadata in tree structures, and then flattening the tree structures to temporary tables on the fly to be updated as needed for a given operation.

The one or more pivot grids may be employed to facilitate performing joins with the temporary tables and using SQL constructs, such as rollup and grouping, to obtain subtotals for the lowest levels of one or more dimensions in a grid row or column axis. The tree hierarchy may then be reverse mapped to the data returned by database and rendered hierarchically via one or more updated pivot girds. The queries may be dynamically executed against the database, such that data retrieved data is always fresh. A query is said to be dynamically executed against a database of computer code defining the query is automatically generated by software and executed in response to one or more control signals.

The second example method 350 may further include employing one or more pivot grids and a Tree Access Manager (TAM) API (e.g., corresponding to the tree structure module 18 of FIG. 1) to flatten the tree structure, and to then perform a join with a select table, i.e., table including leaf data. The TAM may return the tree select table and a WHERE criteria for use with an SQL select statement.

A given pivot grid query may be joined with a select table and NODE table (e.g., table containing tree structure hierarchy information) to facilitate retrieving data in response to a query. The TAM may be used to identify a hierarchy associated with a particular tree structure.

The second example method 350 may further include (or one or more steps 352-360 of the method 350 may be replaced with) with the following steps: accepting a signal from a user input device to select a data set for viewing;

accepting a signal from a user input device to select a hierarchy for viewing the data set; and using the selected hierarchy to organize the data when the data is displayed in subsequent analysis windows.

Although the description has been described with respect to particular embodiments thereof, these particular embodiments are merely illustrative, and not restrictive. For example, while various embodiments are discussed with reference to enterprise software leveraging client-server architecture, embodiments are not limited thereto. Embodiments may be implemented entirely on single computer, and embodiments need not be limited to enterprise applications, but may be applicable to use by governments, education institutions, individuals, researchers, and so on, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating transforming or updating displayed data in an enterprise computing environment, the enterprise computing environment including one or more client devices in communication with a server system, wherein the server system executes webpage software, wherein the webpage software provides webpage information accessible to one or more client devices, the server system executing steps of the method, the method comprising:

providing a user interface display that includes controls to: select a tree to attach or detach to a set of data in response to a user selection: and attach or detach a tree name and a tree node to associate or disassociate a tree structure with the set of data;

generating one or more flattened temporary tree tables based on a tree hierarchy of the selected tree, wherein the one or more flattened temporary tree tables are stored in a database, wherein the one or more flattened temporary tree tables provide live access via constructs to data from a dataset that is in the database, wherein the data represents leaf nodes of the tree hierarchy;

storing hierarchy information via one or more metadata tree tables, wherein the hierarchy information characterizes relationships between nodes of the tree hierarchy;

reverse mapping the hierarchy information relative to the data maintained in the one or more flattened temporary tree tables;

selectively accessing the database using the constructs to update the data characterized by metadata of the one or more metadata tree tables;

using the one or more pivot grids to replicate one or more hierarchical properties of the one or more metadata tree tables, based on the reverse mapping relative to the data maintained in the one or more flattened tree tables;

providing information based on the one or more pivot grids, the information adapted to be displayed via one or more client devices;

detecting a user initiated change to the one or more pivot grids; and in response to the user initiated change to the one or more pivot grids, retrieving a proper subset of the dataset related to the user initiated change to the one or more pivot grids and updating the one or more flattened temporary tree tables based on the proper subset of the dataset related to the user initiated change to the one or more pivot grids without using a cache call.

2. The method of claim 1, wherein displaying further includes using the one or more pivot grids to generate and display an analytic.

3. The method of claim 1, further including:
employing one or more Structured Query Language (SQL) constructs to represent multi-dimensional data included in the one or more pivot grids, using one or more SQL queries.

4. The method of claim 3, further including:
dynamically executing the one or more SQL queries against the database, whereby when data in the database changes, corresponding data in the one or more metadata tree tables is automatically updated.

5. The method of claim 3, wherein the one or more SQL constructs includes an SQL rollup construct, and further including employing the SQL rollup construct to aggregate data of the dataset from the database, and wherein the one or more SQL constructs further include an SQL grouping construct.

6. The method of claim 1, further including:
representing the dataset via a first hierarchical tree structure;
using the first hierarchical tree structure to generate a first set of one or more tables of data characterizing the data of the dataset;
receiving user input indicating one or more operations to be performed on the first set of one or more tables;
performing the one or more operations on the first set of one or more tables, resulting in an updated second set of one or more tables in response thereto; and
using the updated second set of one or more tables to generate a second hierarchical tree structure reflecting a change in an arrangement of data responsive to the updating of the first set of one or more tables.

7. The method of claim 6, wherein employing further includes using metadata to store hierarchical information characterizing the first hierarchical tree structure, and wherein the first and second sets of one or more tables include the one or more flattened temporary tree tables.

8. The method of claim 6, wherein performing includes using one or more pivot grids to perform the one or more operations.

9. The method of claim 8, wherein the one or more operations include a join operation, whereby the join operation results in joining two or more tables of the first set of one or more tables of data.

10. The method of claim 6, further including:
mapping data of the updated second set of one or more tables to a pivot grid reflecting a hierarchical arrangement of data of the updated second set of one or more tables.

11. The method of claim 10, wherein the pivot grid includes one or more hierarchical dimensions.

12. The method of claim 11, further including:
providing a first user option to manipulate data of the pivot grid, and using an Structured Query Language (SQL) construct to facilitate manipulating data of the pivot grid in response to user selection of the first user option.

13. The method of claim 12, further including:
displaying an analytic illustrating data of the pivot grid, and providing a user option to modify the analytic, wherein modifications to the analytic trigger automatic updating of the pivot grid and the first hierarchical tree structure to reflect the modifications.

14. The method of claim 11, further including:
mapping hierarchical data dimensions of the second hierarchical tree structure to one or more dimensions of the pivot grid.

15. The method of claim 14, further including:
implementing the mapping without caching data identified by metadata nodes of the first or second hierarchical tree structures.

16. The method of claim 10, wherein the first set of one or more tables include one or more flattened tables.

17. The method of claim 16, wherein the one or more operations to be performed on the one or more tables include a rollup operation, and further including:
using the rollup operation to obtain one or more subtotals for one or more lowest levels of a dimension of the pivot grid, and wherein the one or more operations include a table join operation.

18. The method of claim 1, further including providing a user option to augment a hierarchy characterizing the pivot grid by:
attaching a hierarchical tree structure to a dimension of the pivot grid; and
mapping the attached hierarchical tree structure to the dimension of the pivot grid.

19. An apparatus comprising:
a digital processor coupled to a display and to a processor-readable storage device, wherein the processor-readable storage device includes one or more instructions executable by the digital processor to perform the following acts:
providing a user interface display that includes controls to:
select a tree to attach or detach to a set of data in response to a user selection; and
attach or detach a tree name and a tree node to associate or disassociate a tree structure with the set of data;
generating one or more flattened temporary tree tables based on a tree hierarchy of the selected tree, wherein the one or more flattened temporary tree tables are stored in a database, wherein the one or more flattened temporary tree tables provide live access via constructs to data from a dataset that is in the database, wherein the data represents leaf nodes of the tree hierarchy;
storing hierarchy information via one or more metadata tree tables, wherein the hierarchy information characterizes relationships between nodes of the tree hierarchy;
reverse mapping the hierarchy information relative to the data maintained in the one or more flattened temporary tree tables;
selectively accessing the database using the constructs to update the data characterized by metadata of the one or more metadata tree tables;
using the one or more pivot grids to replicate one or more hierarchical properties of the one or more metadata tree tables, based on the reverse mapping relative to the data maintained in the one or more flattened tree tables;
providing information based on the one or more pivot grids, the information adapted to be displayed via one or more client devices;
detecting a user initiated change to the one or more pivot grids; and
in response to the user initiated change to the one or more pivot grids, retrieving a proper subset of the dataset related to the user initiated change to the one or more pivot grids and updating the one or more flattened temporary tree tables based on the proper subset of the dataset related to the user initiated change to the one or more pivot grids without using a cache call.

20. A processor-readable storage device including instructions executable by a digital processor, the processor-readable storage device including one or more instructions for:
providing a user interface display that includes controls to:
select a tree to attach or detach to a set of data in response to a user selection; and
attach or detach a tree name and a tree node to associate or disassociate a tree structure with the set of data;
generating one or more flattened temporary tree tables based on a tree hierarchy of the selected tree, wherein the one or more flattened temporary tree tables are stored in a database, wherein the one or more flattened temporary tree tables provide live access via constructs to data from a dataset that is in the database, wherein the data represents leaf nodes of the tree hierarchy;
storing hierarchy information via one or more metadata tree tables, wherein the hierarchy information characterizes relationships between nodes of the tree hierarchy;
reverse mapping the hierarchy information relative to the data maintained in the one or more flattened temporary tree tables;
selectively accessing the database using the constructs to update the data characterized by metadata of the one or more metadata tree tables;
using the one or more pivot grids to replicate one or more hierarchical properties of the one or more metadata tree tables, based on the reverse mapping relative to the data maintained in the one or more flattened tree tables;
providing information based on the one or more pivot grids, the information adapted to be displayed via one or more client devices;
detecting a user initiated change to the one or more pivot grids; and
in response to the user initiated change to the one or more pivot grids, retrieving a proper subset of the dataset related to the user initiated change to the one or more pivot grids and updating the one or more flattened temporary tree tables based on the proper subset of the dataset related to the user initiated change to the one or more pivot grids without using a cache call.

21. The method of claim 1, wherein the user interface includes a search control section that returns recently attached trees and enables the user to enter a tree name to search for, wherein the tree name that is searched for is returned and the user is enabled to select a tree for association with a particular data component.

* * * * *

UNITED STATES PATENT AND TRADEMARK OFFICE
CERTIFICATE OF CORRECTION

PATENT NO. : 10,585,892 B2
APPLICATION NO. : 14/710448
DATED : March 10, 2020
INVENTOR(S) : Madhalam et al.

It is certified that error appears in the above-identified patent and that said Letters Patent is hereby corrected as shown below:

On the Title Page

On page 2, Column 2, under Other Publications, Line 8, delete "Anlysis;" and insert -- Analysis; --, therefor.

On page 2, Column 2, under Other Publications, Line 50, delete "201O;" and insert -- 2010; --, therefor.

In the Specification

In Column 1, Line 17, delete "specification:" and insert -- specification. --, therefor.

In Column 6, Line 8, delete "display" and insert -- display. --, therefor.

In Column 8, Line 23, delete "on" and insert -- on. --, therefor.

In Column 16, Line 36, delete "in in" and insert -- in --, therefor.

In Column 20, Line 26, delete "and or" and insert -- and/or --, therefor.

In Column 21, Line 42, delete "system" and insert -- system. --, therefor.

In the Claims

In Column 24, Line 34, in Claim 1, delete "selection:" and insert -- selection; --, therefor.

In Column 26, Line 67, in Claim 19, delete "o f" and insert -- of --, therefor.

Signed and Sealed this
Third Day of November, 2020

Andrei Iancu
*Director of the United States Patent and Trademark Office*